May 1, 1951  R. L. MOORE ET AL  2,551,332
MACHINE FOR PROCESSING SHEET-LIKE OBJECTS
Filed Nov. 6, 1947  11 Sheets-Sheet 1
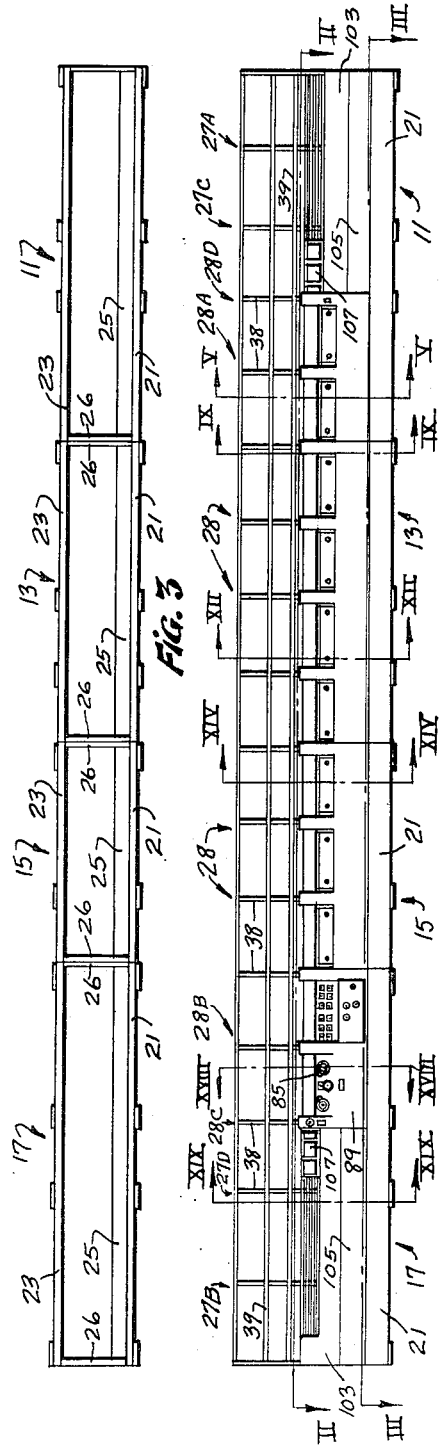
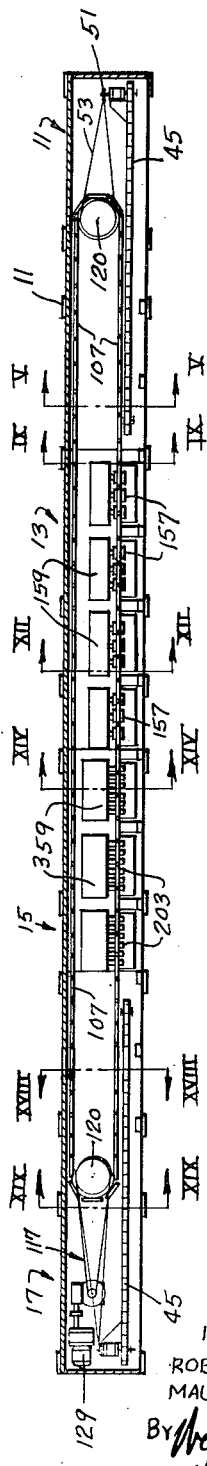
INVENTORS
ROBERT L. MOORE
MAURICE HENKIN
By Weatherford and
Weatherford
attys

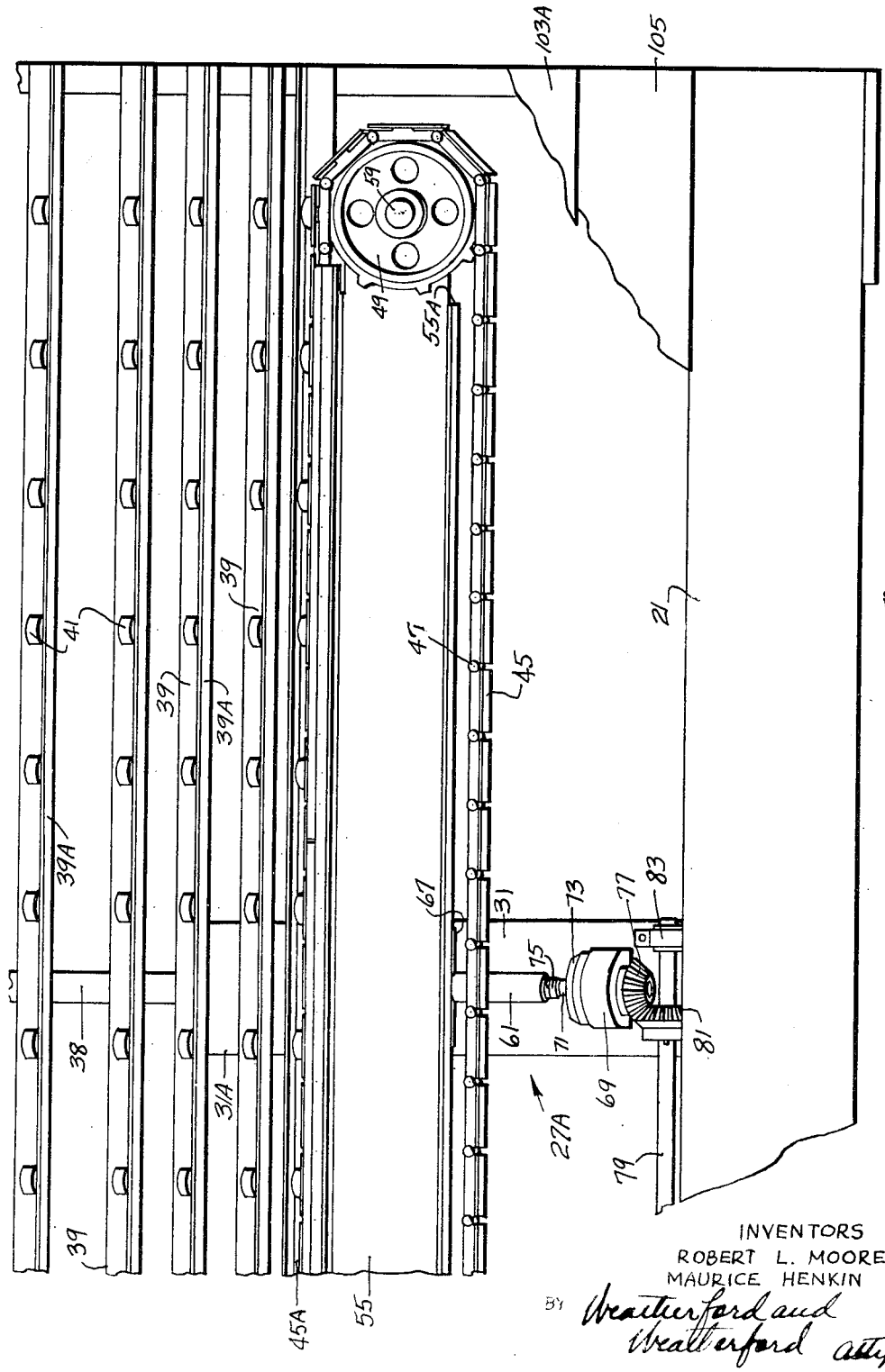

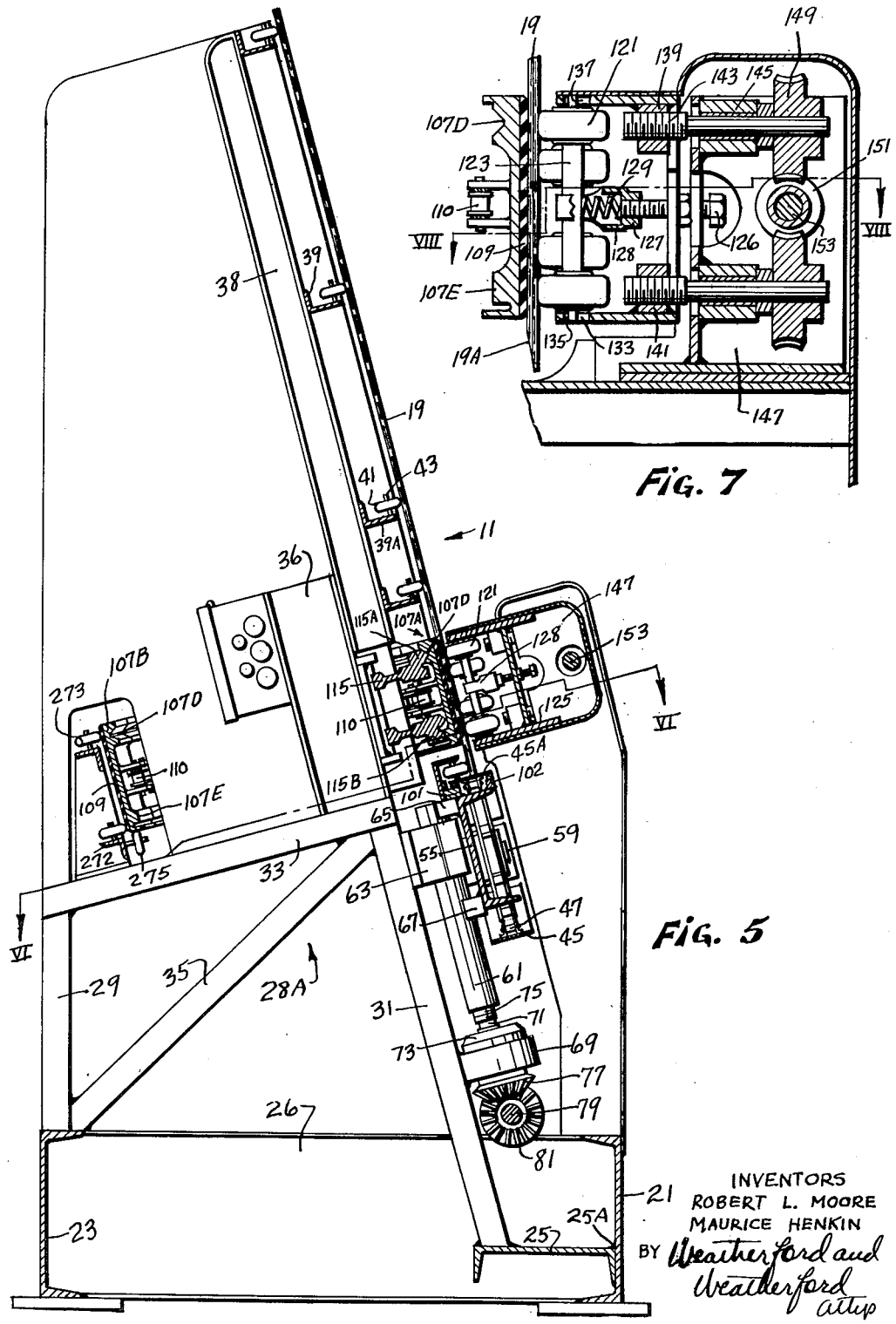

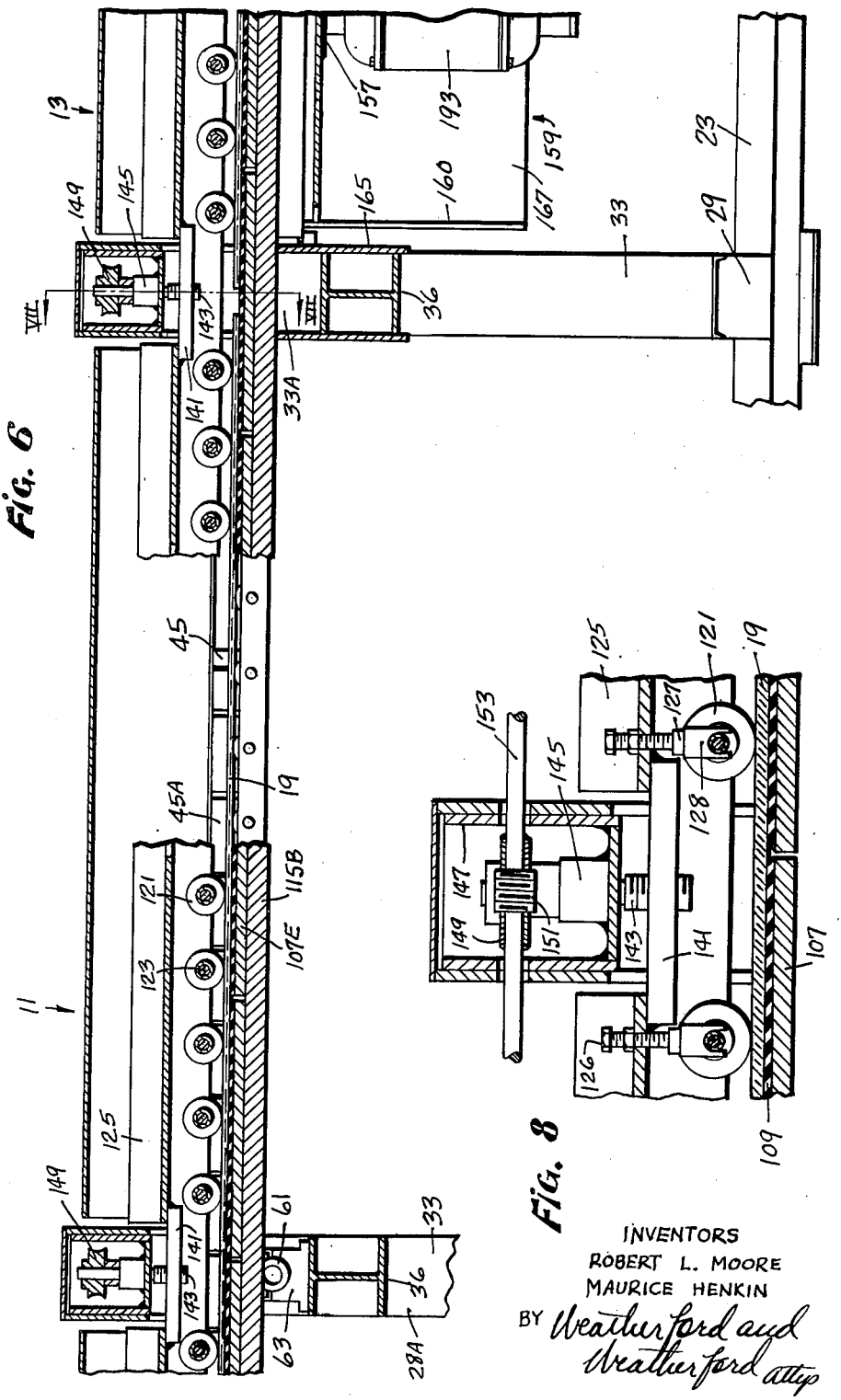

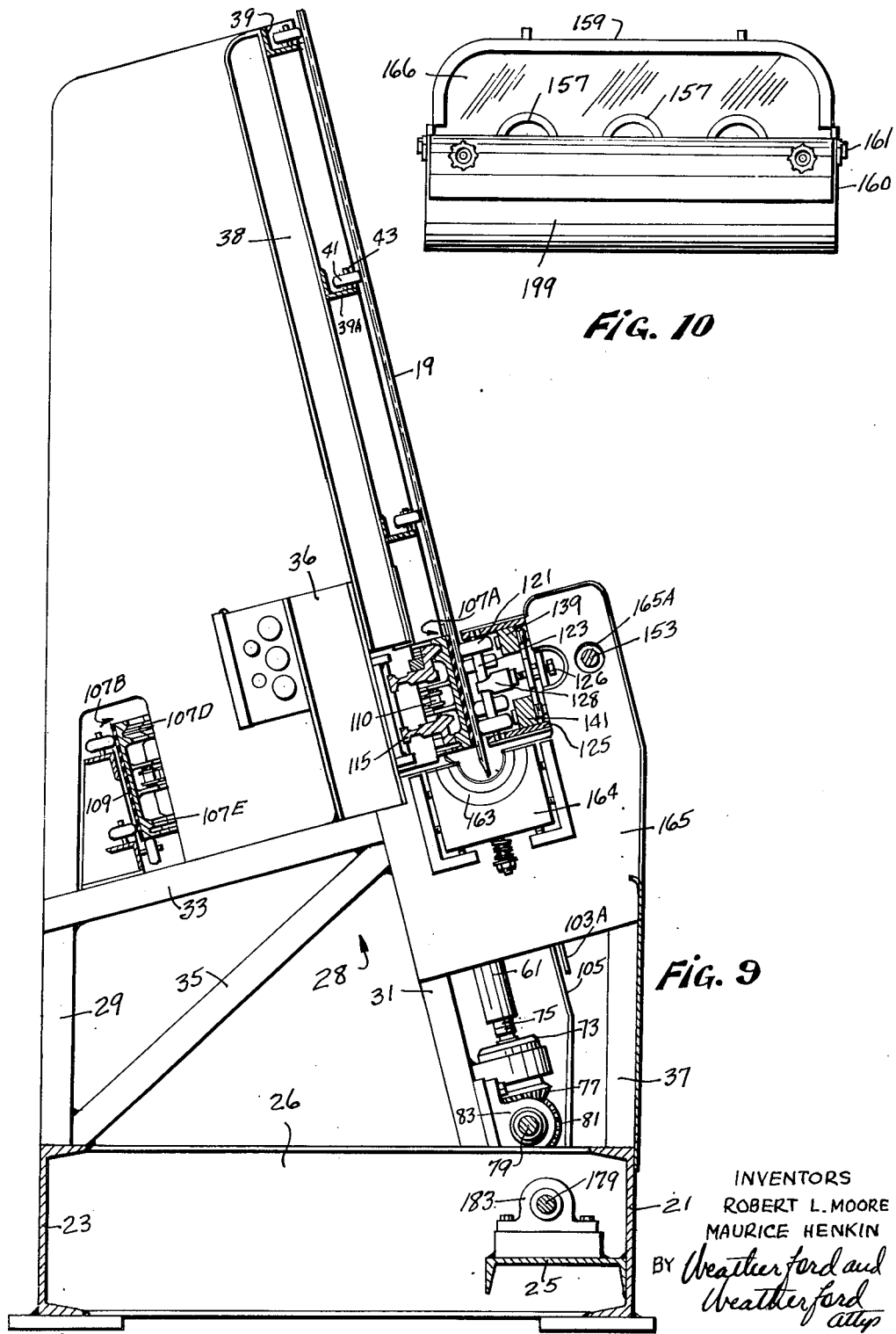

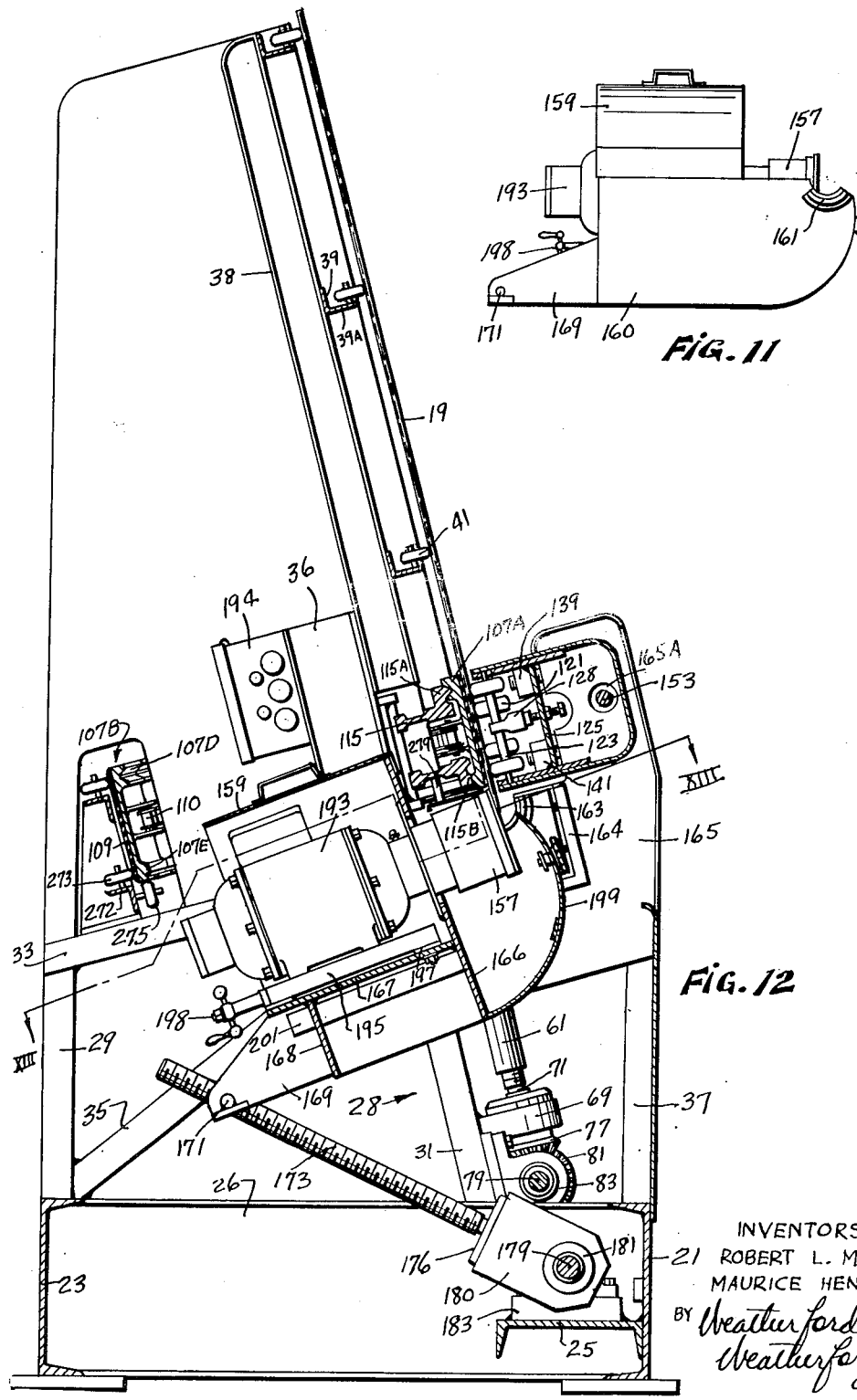

FIG. 13

INVENTORS
ROBERT L. MOORE
MAURICE HENKIN
BY Weatherford and
Weatherford attys

INVENTORS
ROBERT L. MOORE
MAURICE HENKIN
BY *Weatherford and Weatherford* Atty.

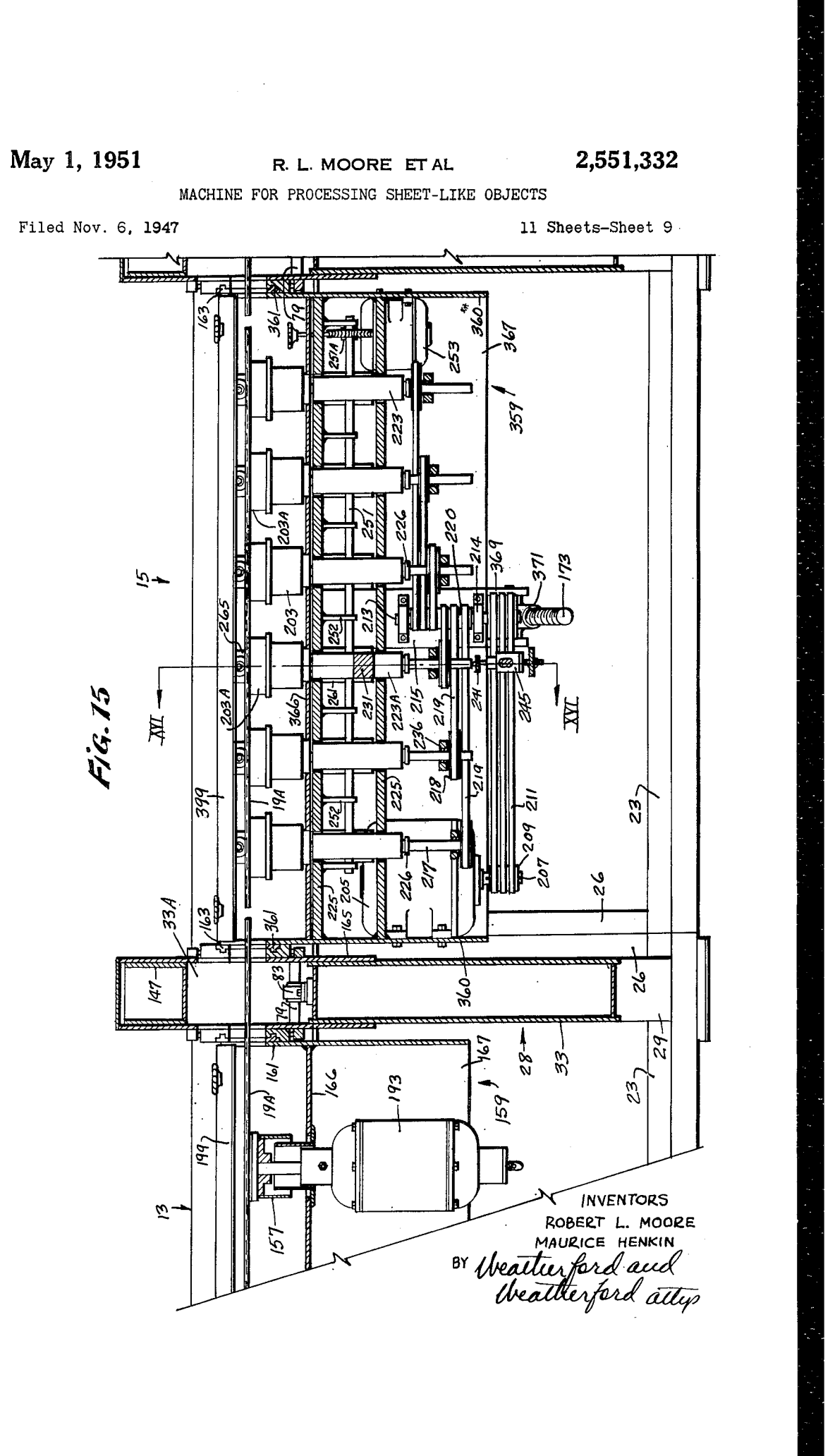

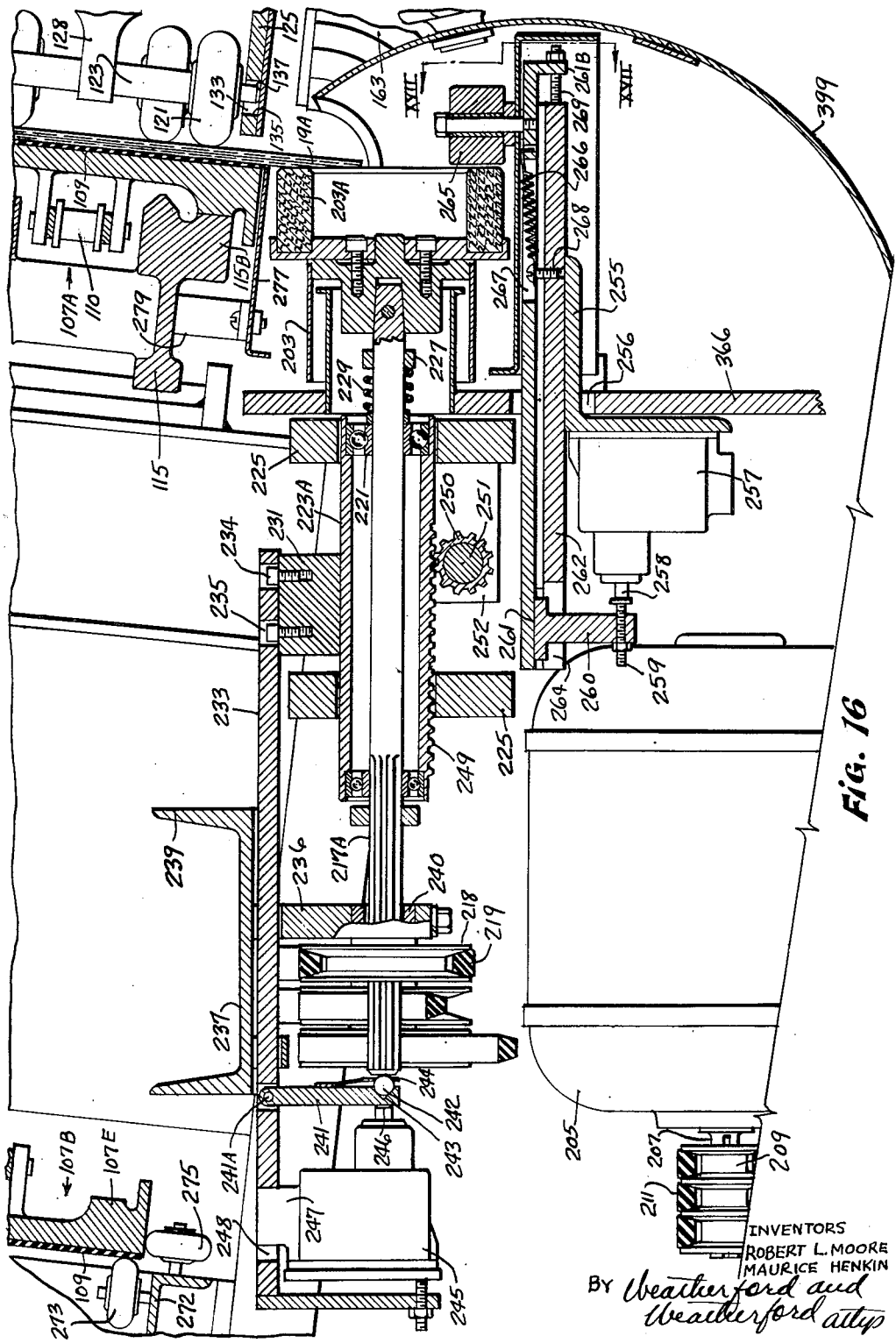

May 1, 1951
R. L. MOORE ET AL
2,551,332
MACHINE FOR PROCESSING SHEET-LIKE OBJECTS
Filed Nov. 6, 1947
11 Sheets-Sheet 11
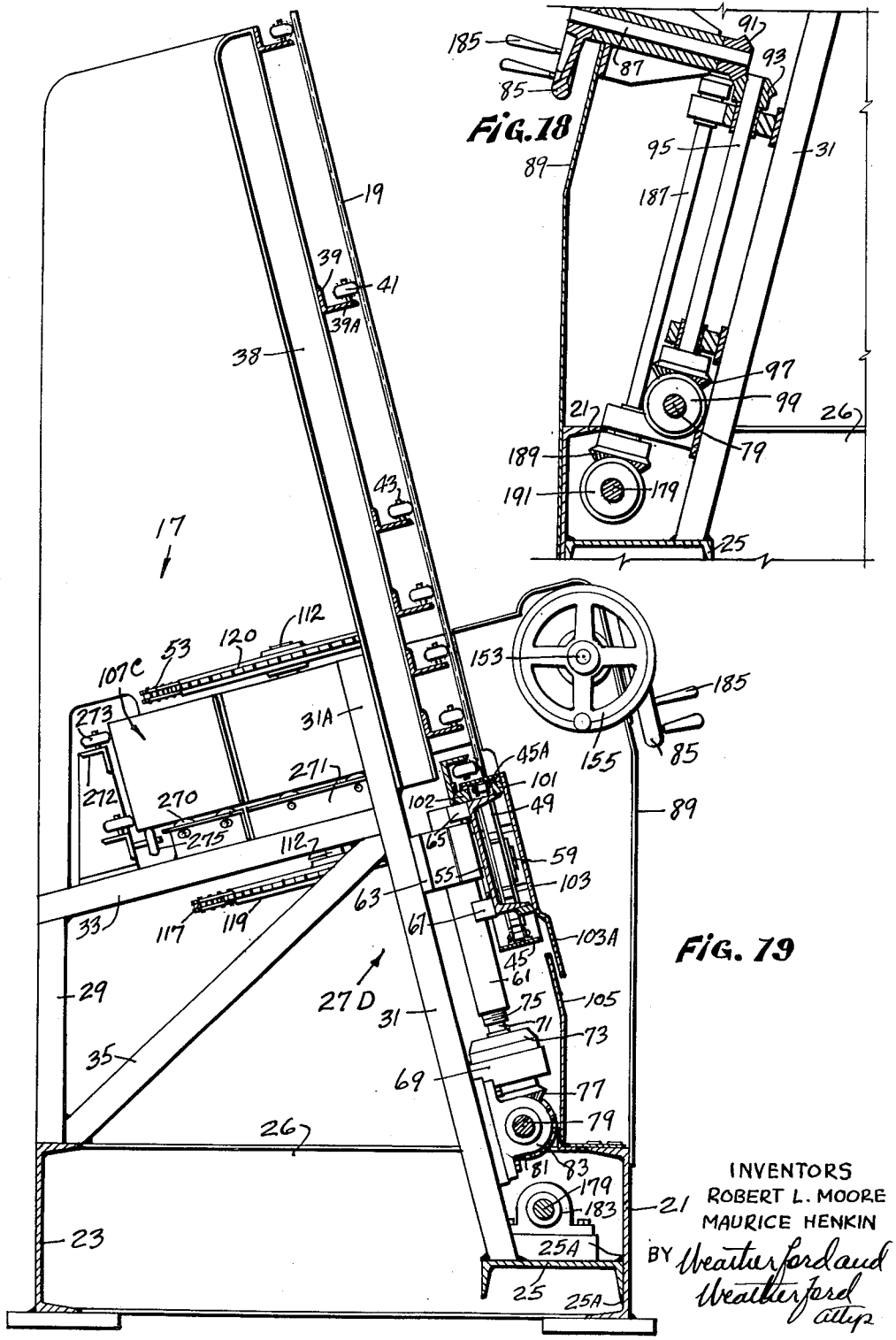
INVENTORS
ROBERT L. MOORE
MAURICE HENKIN
BY Weatherford and Weatherford
attys Patented May 1, 1951

2,551,332

UNITED STATES PATENT OFFICE 2,551,332

MACHINE FOR PROCESSING SHEETLIKE OBJECTS

Robert L. Moore and Maurice Henkin, Memphis, Tenn., assignors to Binswanger Mirror Co., Memphis, Tenn., a corporation of Tennessee Application November 6, 1947, Serial No. 784,402

29 Claims. (Cl. 51—110)

This invention relates to certain new and useful improvements in means and methods of grinding and polishing bevels on glass sheets, particularly plate glass of the type which is employed in the production of fine mirrors.

From its very beginning the glass industry, and particularly that portion of the industry devoted to the production of mirrors, has been characterized by hand craft methods of processing, and the method of producing bevels on mirrors and other glass surfaces has been an extremely laborious method requiring a multiplicity of separate hand operations.

The present invention primarily relates to a machine for mechanically grinding and polishing straight bevels on glass surfaces such as plate glass mirrors, and to new and novel methods of producing such straight bevels. The present machine is capable of beveling plate glass surfaces in a minor fraction of the time heretofore required for the hand production of such bevels, and is so constructed as to accurately produce a bevel of precise size and angularity within extremely close tolerances.

The principal object of the invention is to provide a continuous type straight line production machine for mechanically grinding and polishing bevels on flat glass surfaces with accuracy and precision.

A further object of the invention is to provide such a machine in which adjustment may be readily made for the production of a bevel of desired depth.

A further object of the invention is to provide such a beveling machine which includes grinding units for removing successive layers of glass from the area to be beveled, and polishing units for polishing the beveled surface thus formed.

A further object of the invention is to provide such a machine in which the grinding units and polishing units may be angularly adjusted in coordination to establish a desired angularity of the bevel which is to be imparted to the glass.

A further object of the invention is to provide a machine for beveling plate glass which includes means for conveying the sheets of glass successively to grinding units and polishing units for the application of bevels thereto.

A further object of the invention is to provide such a machine in which the moving portion of such conveyor is maintained in a constant plane and the grinding and polishing units are angularly adjusted relative to the fixed plane.

A further object of the invention is to provide a machine for beveling plate glass which includes a substantially vertically disposed longitudinally moving conveyor which is adapted to contact a face of the respective sheets of glass to be moved along the machine in which the respective sheets of glass are held against the moving conveyor by substantially horizontally adjustable means.

A further object of the invention is to provide a machine for beveling plate glass which includes means for holding the plate glass which are adjustable to compensate for varying thicknesses of sheets of glass to be processed by the machine; and A further object of the invention is to provide such a plate glass beveling machine and to generally improve the design, efficiency and operation of the beveling processes.

The means by which the foregoing and other objects are accomplished, and the manner of their accomplishment will readily be understood from the following specification upon reference to the accompanying drawings, in which:

Fig. 1 is a longitudinal front elevational view of the machine of the present invention.

Fig. 2 is a somewhat diagrammatic sectional plan view taken on the line II—II of Fig. 1.

Fig. 3 is a similar view taken on the line III—III of Fig. 1.

Fig. 4 is a fragmentary front elevational view on an enlarged scale showing a portion of the loading section of the machine.

Fig. 5 is a sectional elevation, on a scale similar to the scale of Fig. 4, taken on the line V—V of Figs. 1 and 2 and showing further details of the loading section of the machine.

Fig. 6 is a fragmentary sectional plan view, with certain parts additionally broken away for purposes of illustration, taken on the line VI—VI of Fig. 5 and on a similar scale, showing further details of the loading section and its relation to the grinding section of the machine.

Fig. 7 is a fragmentary sectional elevation on a further enlarged scale taken on the line VII—VII of Fig. 6.

Fig. 8 is a fragmentary sectional plan view taken on the line VIII—VIII of Fig. 7 and on a similar scale, said Figs. 7 and 8 illustrating details of the mounting and the adjustment means for the pressure rollers of the machine.

Fig. 9 is a sectional elevation on a scale similar to the scale of Fig. 5 taken on the line IX—IX of Figs. 1 and 2 and illustrating a typical crescent bearing member in relation to one of the composite columns of the machine.

Fig. 10 is a front elevational view on a scale slightly smaller than the scale of Fig. 9 of one of the banks of grinders before positioning in the machine.

Fig. 11 is an end view of the bank of grinders shown in Fig. 10.

Fig. 12 is a sectional elevation, on a scale similar to the scale of Fig. 5, taken on the line XII—XII of Figs. 1 and 2 and illustrating details of the grinder banks of the machine.

Fig. 13 is a fragmentary sectional plan view on a similar scale taken on the line XIII—XIII of Fig. 12, and illustrating further details of the grinder section of the machine and its relation to the polisher section.

Fig. 15 is a fragmentary sectional plan view on a similar scale taken on the line XV—XV of Fig. 14, further illustrating details of the polisher section of the machine and its relation to the grinder section.

Fig. 16 is a fragmentary sectional elevation on a further enlarged scale taken on the line XVI—XVI of Fig. 15, and illustrating the details of the controls for the polishers.

Figure 17:
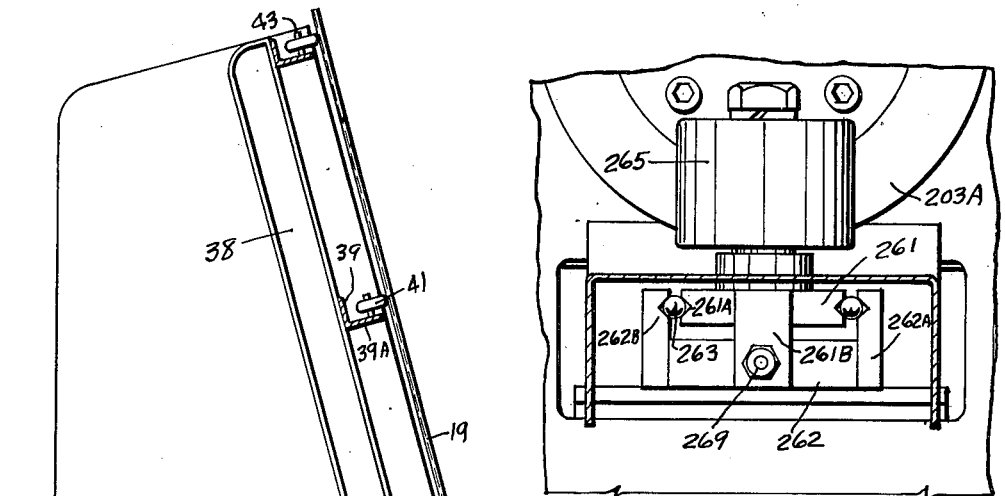
Fig. 17 is a fragmentary sectional elevational view on a further enlarged scale taken on the line XVII—XVII of Fig. 16 and illustrating details of the safety switch mechanism of the device.

Fig. 18 is a fragmentary sectional elevation on the scale of Fig. 5, taken on the line XVIII—XVIII of Figs. 1 and 2 and illustrating the details of the controls of the longitudinal table adjustment shaft and the longitudinal angle control shaft of the invention; and Fig. 19 is a sectional elevation on a similar scale taken on the line XIX—XIX of Figs. 1 and 2 and illustrating details of the unloading section of the machine.

Referring now to the drawings in which the various parts are indicated by numerals, the machine in general is divided into sections through which the glass being processed is continuously moved in succession, the present preferred form of the machine including a glass feed or loading section 11, a bevel grinding section 13, a bevel polishing section 15, and an unloading or removal section 17.

In the loading section 11 sheets of glass 19 are successively introduced to the machine and are positioned in the substantially upright position which is maintained throughout the movement and processing of the glass by the machine. In the loading section the substantially upright sheets of glass are vertically adjusted to establish the desired depth of the portion which is to be beveled by the machine. The glass is conveyed from the loading section to the grinding section, in which latter section a plurality of grinding wheels are positioned which are disposed to successively remove layers of glass from the glass section to be beveled and to thereby cut the glass section to the size of bevel desired. The movement of the now beveled glass sheets is continuous and passes from the grinding section to the polishing section, in which section the bevel is polished and finished. After the glass has passed through the polishing section and the polishing is thus completed, it is moved to the removal section from which it is taken for storage or further processing if desired.

Each section includes a base, preferably including front and rear channel members 21, 23 which respectively have their webs vertically disposed and their flanges or legs horizontally disposed and projecting inwardly. A third longitudinal channel member 25 is also preferably included and is disposed with its web horizontal and its legs or flanges projecting downwardly. The forward flange of the member 25 is preferably secured to the inner face of the web of the front longitudinal member 21 intermediate the span of the web, as by welding 25A, so that the longitudinal member 25 projects inwardly from the front channel member and is supported intermediate its ends by its rigid attachment along one flange to the web of the front channel member. The member 25 spans between and is rigidly secured at its ends as by welding to transverse members 26, which are preferably channel members respectively rigidly secured to the front and rear channel members 21, 23 and are adapted to tie the longitudinal members together and to furnish end support for the member 25 in each of the sections.

Each section includes a plurality of longitudinally spaced composite columns 27, 28 which are made up preferably from channel members, and each of which includes a rear upright member 29, the lower end of which is seated on and rigidly secured, preferably by welding, to the upper inwardly projecting horizontal flange of the rear channel member 23. The main upright members of the composite columns consist of channel members 31 which are rigidly secured, also preferably by welding, to the horizontally disposed web of the longitudinal members 25 and are disposed at a rearward angle of inclination from the vertical, preferably at an angle of approximately fifteen degrees. The members 31 are of a sufficient length to extend above the upper ends of the rear vertical members 29 and are preferably positioned with their legs or flanges projecting rearwardly and the faces of the webs forwardly.

Rigidly secured to the main column members 31 adjacent their upper ends are transverse members 33 which are disposed at right angles to the main column members 31 and extend therefrom rearwardly and on a downward incline of about fifteen degrees from the horizontal to the rear vertical members 29, to the upper ends of which they are rigidly secured, as by welding. The columns preferably include diagonal members 35, also preferably channel members, which are rigidly secured at their lower and rearward ends to the rear vertical members 29 and to the upper flanges of the rear longitudinal members 23 adjacent the junction of these members and extend diagonally upward therefrom to the junction of the main column members 31 with the transverse members 33, to both of which members the diagonal members 35 are preferably secured as by welding. It is believed obvious that the diagonal members provide a strengthening brace for the composite column structure.

In each of the columns 27 the face of the main column member 31 is extended above the transverse column member 33 by a continuation 31A of the main column member 31, as illustrated in Fig. 19. In each of the intermediate columns 28 the transverse member 33 is extended forwardly beyond main member 31 by an extension 33A, although extension 33A is preferably omitted from columns 28A, 28B, 28C, and 28D, and the face of the main member is continued by an H member section 36, which, as illustrated in Figs. 5, 9, 12 and 14, is seated on and rigidly secured as by welding to the transverse member 33 and extends upward therefrom perpendicular thereto with the face of one of the flanges of the H section in alinement with the forward face of the main column member 31. The columns 28 each include a forward vertical member 37, consisting preferably of a channel section, which is seated on and rigidly secured to the horizontal upper flange of a front longitudinal member 21 and extends vertically upward therefrom to an extension 33A of transverse member 33 to which it is preferably rigidly secured as by welding.

The columns 27, 28 include supports 38 which are alined with the rearwardly tipped faces of the members 31 of the columns and which are rigidly secured to and project substantially above the continuations 31A or 36 of the faces of members 31. The supports 33 are preferably formed of channel sections, of which one flange lies along and is rigidly secured in alined contact with the face continuation with which it is associated and which have the other flange lying parallel to the rearwardly tipped faces of the members 31 and respectively positioned forwardly thereof. The supports 38 are provided for the mounting of longitudinally extending roller supporting members 39 which are preferably formed of angle iron and respectively rigidly secured as by welding to the forward faces of the supports 38, the angle members 39 being parallel and each having one leg 39A projecting forwardly from the forward face of the supports 38. It will be noted that the legs 39A are at right angles to the forward face of the supports 38 and are parallel to the transverse members 33. Each angle member journalledly supports a plurality of idler rollers 41, each said roller being journalled on a spindle 43 which projects upwardly from the leg 39A at right angles thereto, the spindles being axially alined so that the rollers are disposed in alinement parallel to the rearwardly tipped forward face of the support 38.

Within the loading section the glass 19 is positioned with its lower edge, which is to be processed by the machine, supported by a conveyor 45 and is tipped rearwardly until the surface of the glass rests against the rollers 41 by which the glass is supported at an angle of inclination from the vertical of approximately fifteen degrees. The conveyor is preferably a table top roller chain 47 driven by sprockets 49 which are coupled in suitable fashion, as by pulley 51 and belt 53 to the main drive of the machine. The sprockets 49 are supported parallel to the rearwardly tipped face of the supports 38 and of the members 33 so as to be similarly tipped rearwardly, to position the glass-supporting upper flight 45A of the conveyor at right angles to the rearwardly inclined glass 19 to be supported thereby.

The sprockets 49 and conveyor 45 are supported for upward and downward adjustment in the inclined plane in which they lie by a longitudinal table member 55 which consist preferably of a channel member longitudinally disposed with its web parallel to the face of the members 31 and supports 38 and with the legs or flanges of the channel projecting forwardly at right angles to the web and parallel to the glass-supporting flight 45A of the conveyor. At its opposite ends the table member has mounted in the web thereof suitable bearings in which are journalled spindles 59 of the sprockets 49 and the respective flanges of the table member 55 are cut away as at 55A adjacent the bearing mountings to eliminate interference with the rotational movement of the sprockets. Intermediate the ends of the table member 55 it is rigidly secured to and supported by internally threaded tubes 61, which tubes are slidably supported in centrally bored guide members 63, which are respectively secured to the forward face of column member 31 of the columns 27A, 28A with the central bore thereof parallel to the rearwardly inclined face of the column member.

The attachment of the table member to each threaded tube is preferably accomplished by upper and lower blocks 65, 67, the upper blocks 65 being rigidly secured as by welding to the rear of the web of the table member substantially in alinement with the upper face of the upper flange of the table member and being rigidly secured to the tubes 61 above the bored guide members 63. The lower blocks 67 are rigidly secured to the rear face of the table member 55 substantially in alinement with the lower face of the lower flange of the table member and are secured to the tubes 61 below the guide members 63. In this manner the blocks 65, 67, in addition to furnishing the means of attachment between the tubes and the table member, are so disposed as to respectively limit the downward or upward movement of the tubes through the guide members and consequently to limit the movement of the table member.

Rigidly secured to the forward faces of column members 31 below the guide members 63 are bearing blocks 69 which are adapted to turnably support shafts 71 including integral thrust collars 73, each intermediate the length of a related shaft, which collars are adapted to seat respectively on the upper faces of the bearing blocks and support the shaft therein. The shafts each include a threaded portion 75 above the collar 73, and each has a bevel gear 77 keyed to its opposite end and adapted to impart rotation to the shaft. The threaded portions 75 are adapted to threadedly engage the internally threaded lower portions of the tubes 61 and upon rotation of the shafts 71 by the gears 77, the slidably mounted tubes are advanced or retracted by the threaded engagement. Rotation of the gears 77 is preferably accomplished by a longitudinal shaft 79 and bevel gears 81 secured to the shaft. The shaft 79 preferably extends from end to end of the machine and is supported intermediate its length by bearings 83 secured to the forward faces of column members 31.

Within the unloading section a substantially identical take-off conveyor 45 is provided, which is similarly adjustably supported by a second longitudinal table member 55 mounted in manner identical with that just above described on additional tubes 61, supported by columns 27B, 28B, the movement of the tubes 61 being effected by identical threaded shafts 71 through bevel gears 77, rotation of which is effected by bevel gears 81 carried by the shaft 79. In this manner the conveyors 45 are identically moved by their associated table members 55, so that when the supported level of the glass being processed is established in the loading section the same level will be established for the unloading section, so as to provide for proper unloading of the processed glass.

The rotation of the shaft 79 is effected by a manual control, such as the wheel 85, which is mounted on the outer end of an inwardly projecting shaft 87 supported in a control panel 89 and carrying at its inner end a bevel gear 91 which engages an additional bevel gear 93 carried by the upper end of a downwardly projecting shaft 95, suitably supported intermediate its length from the face of the column member 31 and which carries at its lower end a bevel gear 97 positioned to engage an additional bevel gear 99 keyed to the shaft 79, so that upon rotation of the wheel 85, the shaft 87 and gear 91 are turned therewith and effect rotation of the shaft 95 and lower bevel gear 97 through the upper bevel gear 93, and thereby effect rotation of the shaft 79 through the bevel gear 99 secured thereto. As described, rotation of the shaft 79 imparts rotation to the threaded shafts 71, effecting simultaneous and coordinated adjustment of the tubes 61 which are engaged by the threaded portions 75 of the shafts 71, and establish desired conveyor level through adjustment of tables 55.

Intermediate the ends of the upper flange of the table members 55 longitudinal conveyor supports 101, 102 are integrally secured and extend therealong. The conveyor supports are spaced apart to provide a clear passageway for the chain 47 of the table top and respectively abut the lower face of the upper flight 45A of the conveyor to effect support of the conveyor.

Preferably a cover plate 103 is secured at its upper end to the forward conveyor support 101 and intermediate its length is secured to the lower flange of the table member 55 and continues therebelow with a depending skirt portion 103A. The skirt portion is of sufficient length to overlap the upper edge of a lower cover 105 which is preferably fixed to the upper flange of front longitudinal member 21. It will be seen that the cover member 103, being rigidly attached to the table member 55, will move therewith during the adjustment of the position of the table member and the overlapping skirt portion will maintain closure of the junction between the cover plate 103 and the lower cover plate 105.

After the glass 19 has been rested in edge supported position on the loading conveyor 45 and tipped rearwardly to rest against the rollers 41 it is moved by the conveyor toward the grinding section 13. Within the loading section 11 the glass is transferred from the loading conveyor 45 to the main conveyor means by which it is supported and conveyed throughout the processing steps. The moving element of the main conveyor means comprises an articulated endless tread 107 having a forward flight 107A and rearward or return flight 107B, these flights being respectively disposed substantially upright and at a rearward angle of inclination of approximately fifteen degrees, the face of the forward flight being alined with the forward edges of the rollers 41 and parallel to the alinement of the glass 19 as initially positioned in the loading section. The tread is preferably made up of plate-like members 107C, of which the outer face is preferably finished with extreme precision in order to establish a base surface for the support of the glass. Each of the plates of the precision tread is preferably covered with a resilient surface, such as the rubber facing 109, which is applied with extreme care as to uniformity and thickness in order to preserve the precision of the base created in the finishing of the respective tread plates.

The coupling of the plates and the drive of the completed tread is accomplished by a roller chain 110 secured to the rear face of the respective plates. End support and drive of the chain, and consequently of the tread, is accomplished by sprockets 111, respectively disposed in the loading and unloading sections of the machine intermediate the length of the respective conveyors 45 and positioned so that the precision tread overlies the rearward portion of the glass-supporting faces of the respective conveyors to receive the rearward face of the glass sheets 19 which have been positioned on the loading conveyor 45. The sprockets 111 are mounted on shafts 112, which shafts are preferably journalled in and supported by bridge members spanning between the transverse members 33 of columns 27A, 27C, in the loading section, and of columns 27D, 28C in the unloading section.

Intermediate the sprockets the forward flight of the precision tread is supported by an elongated way 115 which is preferably rigidly secured to the rearwardly tipped faces of the H member extensions 36 of the respective columns 28. The upper portion of the way preferably includes a forwardly projecting male member 115A which is adapted to cooperate with and slidably fit the longitudinally grooved upper portion 107D of the tread plates and at its lower portion the way 115 is provided with a forwardly projecting elongated shoulder 115B extending throughout the length of the way which is adapted to abut and be slidably engaged by a lower shoulder 107E of the tread plates. The upper projection carrying member 115A and the lower shoulder carrying member 115B are spaced apart to permit the passage therebetween of the roller chain 110 of the tread.

Drive of the sprockets 111 is preferably accomplished through a chain 117 and sprocket 119 coupled in usual fashion to a suitable motor 121, the sprocket 119 being mounted preferably on the lower end of the shaft 112 carrying the sprocket 111 within the unloading section. The drive of the respective conveyors 45 is synchronized with the drive of the precision tread by the coupling of the respective belts 53, preferably to additional sprockets 120 carried by the upper ends of each of the shafts 112.

As the loading conveyor 45 moves the glass forwardly, the rear surface of the glass adjacent but above the lower end of the glass is brought into surface contact with the cushion covering 109 of the tread. The opposite or front surface of the glass simultaneously comes into contact with a bank of pressure rollers 121 which serve to clamp the glass firmly against the face of the precision tread. The lower edge of the glass which is to be beveled, indicated at 19A, depends below the pressure rollers 121 and the precision tread 107 and after the glass 19 has passed the end of the loading conveyor 45 the lower edge portion 19A hangs free for processing by the grinding and polishing units of the machine. It is to be noted that the adjustment of the conveyors 45 is actually relative to the lower edge of the tread 107 so as to establish the length of the depending glass section 19A which is to be processed. The bank of pressure rollers extends throughout the machine between the columns 28C and 28D and the rollers are adjustably mounted to accommodate the desired thickness of the glass 19. The rollers 121 are respectively mounted for rotation in spaced pairs upon spindles 123, the spindles being positioned parallel to and spaced outwardly from the glass contacting face of the tread 107, the opposite ends of the spindles being supported by pressure roller boxes 125. One of the roller boxes is disposed between each pair of columns 28 and each is preferably formed of a composite I-beam including parallel upper and lower plates and an intermediate web plate, the upper and lower plates respectively overlying and underlying the upper and lower edges of the web member and being rigidly secured thereto as by welding. Each of the spindles 123 preferably carry a pair of the rollers 121, the rollers 121 being positioned adjacent the ends of alternate spindles 123 and the rollers of the remaining spindles 123 being mounted on the spindles spaced from the ends thereof.

Each of the spindles, intermediate the rollers 121 carried thereby, is adjustably spaced and braced from the web members of the roller boxes through a pressure adjustment assembly which includes an adjustment screw 126 threadedly engaging intermediate its length a suitably threaded aperture in the web member and extending rearwardly into threaded engagement with an internally threaded collar portion 127 of a yoke-like cap 128, the arms of which yoke embrace the sides of the spindle and prevent lateral movement of the spindle. A compression spring 129, which is adapted to urge the spindle and the rollers carried thereby toward the tread 107, is interposed between the spindle and the threaded collar portion 127 and lies between the yoke arms of the cap member 128. It will be seen that the compression spring applies pressure to the spindle with which it is associated and that adjustment of this pressure to provide a yielding brace and establish a desired roller pressure may be accomplished by adjustment of the screw 126. Limited movement of the spindles is permitted by the end mounting of the spindles in the respective upper and lower plates of the roller boxes, the respective ends being inserted into slots 133 in said members which terminate in forward shoulders 135 limiting movement of the spindles toward the tread 107 and rearward shoulders 137 limiting movement away from the tread, which latter movement is also spring resisted. It will be seen that the adjustment of the pressure of the rollers may be readily effected by tightening or loosening the adjustment screw 126.

The roller boxes are rigidly coupled by upper and lower blocks 139, 141 which are of a length to bridge across the respective columns 28 and to effect supporting connection between the respective roller boxes. The web member of each roller box is terminated at each of the columns 28, although the respective upper and lower flanges rearward of the web member may be continued thereacross and cooperate with the upper and lower blocks 139, 141 to effect a stable coupling between the respective boxes. The roller boxes are adjustably supported at the columns 28 by shafts 143 which have their respective inner ends threaded and engaging threaded apertures formed through the upper and lower blocks 139, 141. Through rotation of the shafts 143 the roller boxes may be moved toward or away from the glass contacting face of the tread 107 to effect precise adjustment of the space between the pressure rollers and the face of the tread so as to accommodate a glass sheet of any desired thickness.

The shafts 143 are journalled in bearings 145 carried by gear boxes 147 which are seated on and rigidly secured to the upper faces of forward extensions 33A of transverse members 33 of the columns 28. Within the gear boxes, gears 149 are secured to the ends of the shafts 143 opposite the threaded ends thereof and are engaged for rotation by worm gears 151 carried by an elongated glass thickness control shaft 153, which extends longitudinally of the machine from the column 28C to the column 28D and may be supported in suitable fashion intermediate its length. Rotation of the shaft 153 is preferably effected by a control wheel 155 mounted on the column 28C adjacent the control panel 89 which is preferably secured to a projecting end of the shaft 153. It will be seen that upon rotation of the shaft 153 by the control wheel 155 the worm gears 151 will be turned thereby and effect rotation of the shafts 143, simultaneously advancing or retracting the blocks 139, 141, dependent upon the direction of rotation of the shaft 153. The roller boxes and the rollers carried thereby are simultaneously advanced or retracted upon the movement of the respective upper and lower blocks. It will thus be seen that the rollers may be positioned with great exactness relative to the glass contacting face of the tread 107 to establish a precise spacing between the rollers and the tread for the introduction of a glass sheet 19 therebetween which is held clamped against the tread face by the pressure mounted rollers.

After the glass has been clamped between the tread and roller elements of the main conveyor with the depending portion 19A of the glass extending below these elements, the glass is moved by the tread out of the loading section and into the grinding section. In the grinding section, grinding wheels 157 are mounted in a plurality of banks, each bank including a plurality of grinding wheels. In the present embodiment of the invention, four banks of grinders, each including three grinding wheels, are illustrated. Each of the banks of grinders is preferably provided with a casing 159, having side walls 160 by means of which casing the bank may be handled as a unit for placing and removal. The side walls 160 of the casings 159 are each provided with an arcuate male bearing member 161 of a crescent bearing, which is adapted to slidably engage an arcuate bearing groove 163 of a bearing mounting 164 mounted on and secured to the face of a column side plate 165, such a plate 165 being attached to the respective sides of the columns 28 in the grinding section and in the polishing section, and being extended upwardly to provide a side housing for the gear boxes 147. The plates 165 are apertured for the passage therethrough of shaft 153, each aperture being preferably provided with a bearing 165A to turnably support the shaft 153 intermediate its length. Each casing 159 is supported for arcuate movement through the cooperation of the male and female bearing members 161, 163 which are slidably engaged. It is to be noted that the center of the arc of the bearing groove 163 is positioned on the depending glass section 19A at a point which coincides with the base of the bevel to be formed on this section, so that the grinding units are arcuately adjustable relative to the fixed zero point of angularity thus established.

Rigidly secured to and extending longitudinally between the side walls 160 of casings 159 are front baffles 166 which are disposed substantially upright and which are apertured to receive the heads of the grinding wheels 157. Each casing includes table-like base member 167 which is secured to the side walls 160 and along its forward edge is secured to the rearward face of the baffle 166. Below the table members 167 intermediate longitudinal substantially upright members 168 have their upper edges respectively rigidly secured to the lower faces of the table members and similarly extend between and are secured to the side walls 160 and provide stiffening for the table members. Intermediate the ends of the table members 167 and longitudinal stiffener members 168, projections 169 are secured to the lower faces of the table members and to the rearward faces of the stiffener members, in which projections internally threaded trunnion members 171 are pivotally supported, one such trunnion being provided for each casing 159. The trunnion members 171 are engaged by the rearward threaded ends of elongated screws 173, which extend forwardly and downwardly from the threaded engagement with the trunnions 171 and are journalled in and project forwardly beyond bearings 174 carried by bearing blocks 175, the bearings being retained in the bearing blocks by suitable bearing caps 176. On the forwardly projecting end of each screw member, a bevel gear 177 is fixed to the unthreaded portion of the screw and the gears 177 are adapted to be engaged by bevel gears 178 carried by an elongated grinding angle control shaft 179. Secured to the opposite sides of the bearing blocks 175 are side plates 180, each side plate preferably including a flange bearing 181 through which the shaft 179 is extended and journalled. The side plates 180 serve as thrust members and serve to retain the screw-carried bevel gears 177 in engagement with the shaft-carried bevel gears 178.

It will be seen that upon rotation of the shaft 179 the threaded screws 173 will, by engagement with the trunnions 171, cause the raising or lowering of the projections 169 along an arcuate path, moving the casings 159 to desired adjusted position of angularity relative to the glass section 19A. The shaft 179 is supported intermediate its length by suitable bearings 183 which are mounted on the upper horizontal face of longitudinal members 25 and the shaft 179 extends longitudinally of the machine from the control panel 89 through the polishing section and grinding section. Rotation of the shaft is effected by a wheel 185 mounted on a shaft suitably journalled in the control panel 89 and terminating in a bevel gear engaged with the upper bevel gear of a downwardly projecting shaft 187, which shaft 187 carries at its lower end a lower bevel gear 189 which is adapted to engage a bevel gear 191 carried by the shaft 179, so that upon rotation of the wheel 185, rotation of the elongated shaft 179 is effected and consequently the casing angle adjusting rotation of the threaded screws 173.

Each of the grinding wheels 157 is preferably a cup-type grinding wheel having a diamond cutting face, which cutting faces preferably range from very coarse roughers to finishing grinders having considerably finer grit faces. Each of the grinders is preferably independently driven by a motor 193, the motors 193 of each bank preferably being concurrently controlled from a control box 194 conveniently mounted as on the rear face of an H-member 36. Each of the motors 193 is slidably mounted for forward and rearward adjustment upon and supported by the table-like base members 167. The base of each of the motors is preferably secured to a plate 195 which slidably engages blocks 197 secured to the table member 167. Preferably the forward block 197 is internally threaded to be engaged by the threaded end of an adjustment screw 198 which engages the plate 195 so that upon rotation of the screw it is advanced or retracted through the threaded block and moves with it the plate 195 and the motor casing 193 and grinder 157 carried thereby. Identical adjustment mechanisms are preferably provided for each of the grinders, by which adjustment is made to compensate for wear of the grinder faces.

Preferably secured to the side walls 160 and along one edge to the lower edge of the forward face of the baffle 166 is a forwardly and upwardly curved basin member 199 which is adapted to serve as a settling basin to retain surplus liquid coolant which may be used in conjunction with the grinders, as hereinafter described. An overflow pipe 201 extending through and supported by transverse member 168 and opening through the baffle 166 into the basin may be provided to prevent excess accumulation of such liquid.

The initial grinder in the grinding section is set to contact the depending glass section 19A and to remove a relatively minor layer of glass therefrom. The remaining grinders are successively incrementally advanced forwardly of the initial grinder to successively contact and remove succeeding layers of glass from the depending section 19A as that section is moved along the grinding section. In this manner the bevel, as desired, is formed to size of the required depth and at the desired angularity.

The glass sheet 19 with the bevel thus formed on the depending section 19A is moved by the tread 107 from the grinding section to the polishing section. Within the polishing section, polishers 203 are mounted in a plurality of banks, each bank including a plurality of polishers. In the present embodiment of the invention, three banks of polishers, each including six polishers, are illustrated.

Each of the banks is preferably provided with a casing 359, similar to the casings 159 of the grinders, and by means of which the polisher banks may be each handled as a unit for placing and removal. The side walls 360 of the polisher casings 359 are provided with arcuate male bearing members 361, identical with the bearing members 161 of the grinder casings, which are adapted to slidably engage the bearing grooves 163 of column plates 165 secured to the columns 28 within the polishing section, by which the polisher casings are supported for arcuate movement identical and simultaneous with the arcuate adjustment of the grinder casings.

Rigidly secured to and extending longitudinally between the side walls 360 of each casing 359 is a front baffle 366 which is disposed substantially upright and which is provided with apertures to receive the heads of the polishers 203. The casings 359 each further include a base plate 367 which at its opposite ends is rigidly secured as by welding to the respective lower edges of the side walls 360 and along its forward edge is similarly secured to the lower edge of the baffle 366. Intermediate the ends of the base member 367 and rigidly secured thereto and extending rearwardly therefrom are projections 369, in which projections are pivotally supported internally threaded trunnion members 371 which are similar to the trunnions 171 of the casings 159. Trunnions 371 are engaged by the rearward threaded ends of the elongated screws 173 which are coupled to the shaft 179, in manner identical with that described hereinabove, and illustrated in Fig. 14. Through this arrangement angular adjustment, identical and simultaneous with the angular adjustment of the grinder casings is effected. The polisher casings also preferably include basin members 399 attached to the baffles 366 and end walls 360 and similar to basin members 199 of casings 159.

The polishers 203 of each bank are concurrently driven by a single motor 205 which is connected to a source of power, not shown. The motor is preferably rigidly secured as by bolting to one of the side walls 360 of the polisher casing and drives a motor shaft 207. The motor shaft is preferably coupled by pulleys 209 and belts 211 to an off-set shaft 213 which is journalled in suitable bearings 214 secured to the upper face of an intermediate table member 215 which is rigidly secured at its forward end to the baffle 366, substantially centrally thereof, and is supported at its rear end by an intermediate upright member 216, which is rigidly secured thereto and to the base member 367 as by welding. Each polisher 203 includes a rotatable polishing head 203A, mounted on the forward end of and rotated by a spindle 217. On each spindle a pulley 218 is mounted, preferably by splining, the respective pulleys 218 being arranged in staggered relation. Each of the pulleys 218 is coupled by a belt 219 to a corresponding pulley 220 mounted on the off-set shaft 213, one such pulley 220 being provided for each polisher and spindle. It will be seen that all of the polishers of each bank are driven simultaneously by the motor 205 of that bank, rotation of the spindles 217 being concurrently effected and the rotation of polisher heads 203A carried by the spindles 217 resulting therefrom.

Each of the spindles 217 intermediate its length is journalled in and slidably supported by bearings 221 which are carried by a hollow quill 223. The quills are slidably supported in suitable apertures formed in transversely spaced longitudinally extending wall members 225 which extend between and are rigidly secured to the side walls 360 of the polisher casings. Collars 226 are secured to spindles 217 rearwardly of the quills 223 and normally spaced a minor distance therefrom.

Adjacent but rearwardly of the polisher heads 203A collars 227 are mounted on the spindles 217 and between the collars and the forward bearings 221 compression members, preferably compression springs 229, are interposed and surround the spindles, seating at their forward ends against the collars 227 and at their rearward ends against suitable seat members included in the forward bearings 221, the springs being interposed under compression.

Figure 14:
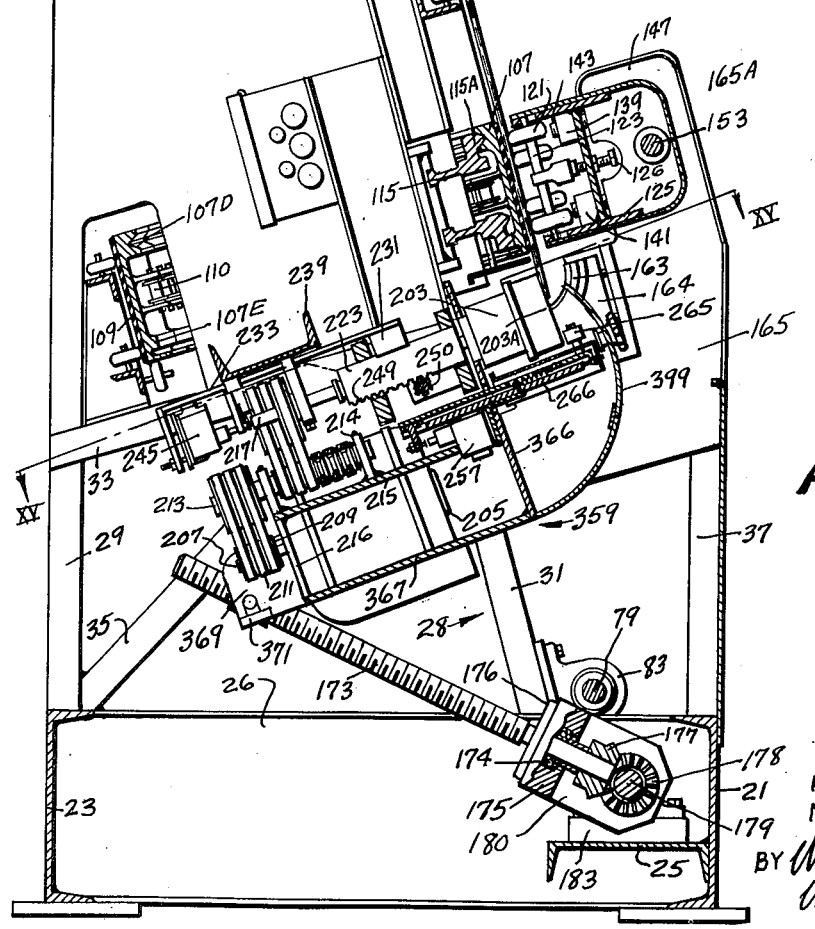
Fig. 14 is a sectional elevation on the scale of Fig. 5, taken on the line XIV—XIV of Figs. 1 and 2 and illustrating details of the polisher section of the machine.

As shown in Figs. 14, 15 and 16, at least one quill 223A of each polisher bank has a block 231 mounted on and rigidly secured to its upper surface, the upper side of the block being connected to an elongated carriage member 233. This connection is preferably made by screws or other suitably headed members 234 projecting through slots 235 formed in the forward end of the carriage member, which slots are preferably of a length slightly greater than the diameter of the securing member so as to permit limited forward and rearward movement of the carriage member relative to the block 231. The screws 234 threadedly engage the block in usual manner. The carriage 233 intermediate its length is slidably supported by bracket members 236, 237 which are rigidly secured to and depend from the downwardly facing web of a longitudinal channel member 239 which is rigidly secured at its opposite ends to the side walls 360 of the polisher casing 359. The bracket member 236 extends below the carriage 233 and adjacent its lower end is provided with a bearing 240 in which the spindle 217A, associated with quill 223A, is journalled and slidably supported adjacent the pulley 218 by which the spindle is rotated, and preferably a similar bracket and bearing is provided for each of the spindles 217.

Rearward of the bracket member 237 an arm 241 preferably is pivotally secured, as at 241A, to the carriage 233, the arm depending from the pivot. The arm 241 adjacent its lower end is provided with a ball member 242 which is mounted in a forwardly facing recess 243 formed in the arm adjacent the lower end thereof, the ball being preferably retained within the recess by a leaf spring member 244 secured to the forward face of the arm 241 above the recess 243 and provided with a suitable aperture through which a portion of the outer surface of the ball may project. The arm 241 is positioned so that the ball 242 carried thereby normally abuts the rear end of the spindle 217A. Rearward of the arm 241 a normally closed type micro-switch 245, having a button control 246, is dependingly supported by an upwardly projecting boss 247 formed in the upper portion of the switch casing, which boss is slidably supported in a slot 248 formed in the carriage member 233 adjacent the rear end thereof. The switch 245 is positioned with the button control 246 abutting and pressed against the rearward face of the arm 241, the normally closed switch being held open thereby. The switch is preferably adjustably spaced to maintain its position relative to the arm 241 by a suitable spacing screw carried by a member depending from the carriage 233. The slot 248 is preferably substantially oval in shape and of a length slightly in excess of the length of the boss 247 so as to permit limited forward and rearward movement of the boss in the slot.

The undersides of the quills 223 are provided with rack sections 249, engaged by pinions 250 mounted on a longitudinal shaft 251 which is supported intermediate its length by and is journalled in suitable bearings carried by rewardly projecting bars 252 which are rigidly secured at their forward ends to the forward longitudinal quill supporting wall 225. The shaft 251 is driven through suitable gearing 251A by a reversible motor 253 which is preferably secured as by bolting to the side wall 260 of the casing opposite that wall upon which the motor 205 is mounted and receives its power from a suitable source of power, not shown. The motor 253 is electrically connected to the micro-switch 245 for control of quill advancing rotation of shaft 251.

The springs 229 are normally under compression so as to hold the polishing heads 203A in a constant pressure relation against the bevel of the glass section 19A which is being polished. As the polishing faces of the polishing heads are worn down during operation, automatic adjustment of the polishers is effected through the means hereinabove described. As the polishing face of a polisher head wears down its spring 229 gradually expands and moves the spindle 217A forwardly, moving the rear end of the spindle out of contact with the ball 242 of the arm 241, thus relieving the circuit breaking pressure on the button 246 of the switch 245. Upon relief of this pressure the switch closes, completing the circuit and energizing the motor 253 which thereupon effects rotation of the shaft 251 and the pinions 250 which engage the racks 249 and advance the quills 223, recompressing the springs 229. As the quill 223A is moved forwardly the block 231 secured thereto through the screws 234 engages the forward extremities of the slots 235 in the carriage 233, moving the carriage, together with the depending arm 241 and depending switch 245, forwardly within the brackets 236, 237, until circuit breaking contact against the end of the spindle 217A is restored, interrupting the quill advancing operation of the motor 253. With the motor 253 stopped the shaft 251 is preferably braked in conventional manner, although such brake is not shown, and the pinions 250 carried by the shaft engaging the racks 249 similarly hold the quills 223 against sliding movement and maintaining fixed rearward seats for the compression springs 229.

A safety switch assembly is preferably included in each polisher bank to interrupt the quill advancing motor circuit through the switch 245 and to complete a motor reversing circuit to the motor 253, in the event of undesired forward overtravel of the polishers 203, either by reason of a failure of the switch 245 or by action of the springs 229 in the event of a gap between succeeding glass plates. This assembly is preferably supported by a member 255 which is preferably formed of an angle iron having one flange projecting forwardly and its other flange projecting downwardly from the rear edge of the forwardly projecting flange. The forwardly projecting flange is preferably extended through an aperture 256 formed in the front baffle 366 of the casing below the polisher 203, and the downwardly projecting flange is preferably secured to the baffle below the aperture.

Mounted on the rearward face of the downwardly projecting flange of the support 255 is a two-position switch 257 having a control button 258. The switch 257 is, in its normal position, wired in circuit with the motor energizing circuit through the switch 245 and upon operation of control 258 is moved out of the first circuit, interrupting that circuit to its second position in which the switch 257 is adapted to establish a second motor energizing circuit for reverse rotation of the motor 253, such reverse rotation of the motor similarly reversely rotating the shaft 251 and effecting retraction of the polishers.

Positioned in alinement with the button 258 in non-pressing contact therewith is the head of a screw member 259 which is threadedly and adjustably secured in the lower end of a depending member 260 which is rigidly secured at its upper end to a carriage 261. The carriage is slidably supported in a track member 262 which is mounted on and rigidly secured to the upper face of the angle supporting member 255, with the carriage and track extending through the aperture 256. Preferably the track member 262 is provided with upstanding side portions 262A which include inwardly faced elongated raceways 262B in which are mounted bearing balls 263 which engage complementary elongated races 261A formed in the edges of the carriage. The depending member 260 extends downwardly through a slot 264 formed in the track member 262. At its forward end the carriage 261 carries an upstanding bumper 265 which preferably comprises a rotatably mounted roller. The bumper member is disposed adjacent and spaced minutely forwardly from the lower portion of the periphery of the polishing head 203A when that head has been advanced into bevel polishing position.

If undesired overtravel of the spindles 217 and consequent excessive advancement of the polishing heads 203A occurs, switch 245 closes, the spindle-carried rear collars 226 are advanced substantially into contact with the rear end of the quills and the bumper 265 is contacted by the polisher head, such contact effecting forward movement of the carriage 261 and of the button contacting screw 259. Such movement presses the button control 258 of switch 257 and moves it from the normal switch position, interrupting the circuit through the now closed switch 245 and thereby preventing quill advancing rotation of the motor 253. Such pressure on the button 258 moves it to the second position of the switch and completes the second circuit to the motor 253, energizing the motor for reverse rotation of the shaft 251 and consequent retraction of the quills and the spindles carried thereby.

Retraction of the quills moves them against collars 226 and consequently retracts the polisher heads from the bumper 265, releasing pressure thereon and permitting return movement of carriage 261 relieving pressure on switch control 258, interrupting the reverse rotation of motor 253 and shaft 251. For the purpose of effecting such return movement of carriage 261, a tension spring 266 is attached at its forward end to the carriage 261 and extends through a slot 267 formed in the carriage to a suitable securing member, such as a screw 268, by which its rearward end is attached to the track member 262. Forward movement of the carriage 261 under polisher pressure on bumper 265 further tenses the spring 266 and upon relief of such polisher pressure by retraction the spring is adapted to return the carriage 261 to its position of original setting. This setting is preferably established and maintained by a spacer screw 269, threadedly engaging a downwardly projecting portion 261B of carriage 261, and abutting the forward end of track member 262.

Upon interruption of the reverse motor rotation circuit, by release of the switch control 258 and return of the switch to its normal first position, the quill advancing circuit through closed switch 245 is closed and the quill advanced as before, recompressing springs 229 for further maintenance of bevel contacting pressure by the polisher heads.

Preferably each polishing bank includes a single automatic adjustment actuating mechanism and safety switch mechanism of the type described, but it will be understood that under extreme conditions and whenever desired similar mechanisms may be employed in relation to additional polishers in each bank.

As the glass 19 passes beyond the final polisher 203 it moves from the polishing section into the unloading section in which the now completed beveled edge of the glass section 19A is brought into edge supported relation with the take-off conveyor 45, which, as described hereinabove, was initially positioned simultaneously with and at the exact level of the loading conveyor 45. As the glass leaves the tread 107 and pressure rollers 121 movement of the glass is continued by the unloading conveyor 45 and the upper portions of the glass are supported against the idler rollers 41 in the unloading section. From this section the beveled glass is removed by an operator and if further bevelling of additional edges of the glass is desired it is returned by suitable means to the loading section of the machine and positioned there for additional processing as desired.

Within the unloading section the tread supported way 115 terminates at the column 28C, and for the purpose of supporting the tread in engagement by sprockets 113, substantially upright idler rollers 270 are journalledly supported in transverse members 271, for edge engagement of the tread, the members 271 being preferably formed of channel iron or angle iron and being seated on and rigidly secured to the upper face of the transverse member 33 of the column 27D. A supporting frame for the rearward or return flight 107B is provided and extends longitudinally of the machine between the columns 27D and 27C. This frame preferably consists of suitable longitudinally supported members 272 formed as of angle iron and supporting idler rollers 273 which are positioned to contact the face of the tread 107. Edge support of the rearward flight of the tread is preferably furnished by additional idler rollers 275 supported from the frame members 272 and disposed to rollingly contact and support the lower edge of the tread.

Means for supporting the tread in sprocket engagement with the sprocket 111 of the loading section is provided by additional idler rollers 270 and transverse members 271 supported from the upper face of the transverse member 33 of the column 27C.

Liquid coolants may be employed with each of the grinders and polishers and, if desired, tanks for containing these liquids may be formed within the base of the machine. Such tanks are not shown in the present illustration of the invention and coolant liquids may be pumped from such tanks or from other sources of supply onto the faces of the grinders and polishers for cooling the glass surface as it is ground and polished, and thereby, if desired, prevent possible damage by overheating to such surface.

The settling basins 199 and 399 are provided to receive the surplus coolant and the glass chips or dust removed from the glass section being processed.

If the use of coolants is desired, splash shields 277 may be employed. One of such shields is preferably provided for each of the polisher banks and grinder banks and are preferably supported at intervals from the way 115 as by brackets 279. The shields each preferably underlie the way and are provided to prevent undesired splashing of coolant onto the various mechanisms of the machine.

We claim:

1. A machine for processing glass sheets to form a bevel along one edge of said sheets, which includes means for supporting and longitudinally moving successive sheets of glass continuously through said machine in a fixed, substantially upright plane, said means including an endless conveyor at one end of said machine and a second endless conveyor at the opposite end thereof, each said conveyor extending longitudinally along a portion of said machine and having an upwardly facing upper flight disposed substantially at right angles to said plane, adapted to successively receive the respective lower edges of the said glass sheets thereon to support said sheets in said plane for movement in said machine adjacent the ends thereof, an endless tread having a forwardly facing flight parallel to said plane, an elongated integral way supporting said tread flight intermediate the ends thereof, one end of said tread flight overlapping a portion of said upper flight of said first conveyor and the other end of said tread flight overlapping a portion of the upper flight of said second conveyor, said tread flight spanning between and being spaced upwardly equidistant from said upper conveyor flights and being positioned to engage the rearward face of each said glass sheet above the lower edge of said sheet with a section of glass sheet extending below said tread, roller means, means supporting said rollers opposite and parallel to said tread flight to engage the forward face of each said glass sheet and spaced from said tread flight for the entry of said glass therebetween, means for moving said roller supporting means toward and away from said tread to adjust said latter spacing to receive said glass sheets, spring means urging said rollers toward said tread to hold said glass sheets against said tread for longitudinal movement of said glass by said tread, stop means carried by said supporting means limiting spring urged movement of said rollers, means for concurrently raising and lowering said conveyors to vary the said spacing of said tread edge therefrom and establish the length of the said lower glass sections and means for driving said conveyors and said tread in coordination, said first conveyor delivering edge supported glass sheets successively to said spacing between said tread and said rollers for engagement thereby; a plurality of grinders disposed below said tread angularly intersecting the plane of movement of said glass in the path of said lower sections and positioned beyond the end of said first conveyor flight to successively grindingly contact the said lower sections of said glass sheets moved by said tread adjacent the lower edge of said sections, each succeeding grinder being incrementally advanced forwardly of its predecessor whereby to remove successive layers of glass from said lower sections and form bevels thereon, means for rotating said grinders; a plurality of rotating polishers below said tread parallel to said grinders, positioned to polishingly contact the bevels formed by said grinders, means for rotating said polishers; and means for concurrently adjusting the angular position of said polishers and grinders relative to the said plane of said glass; said tread delivering the processed said sheets of glass to said second conveyor for movement away from said tread and rollers.

2. A machine for processing glass sheets to form a bevel along one edge of said sheets, which includes means for supporting and longitudinally moving successive sheets of glass continuously through said machine in a fixed, substantially upright plane, said means including an endless conveyor at one end of said machine and a second endless conveyor at the opposite end thereof, each said conveyor extending longitudinally along a portion of said machine and having an upwardly facing upper flight disposed substantially at right angles to said plane, adapted to successively receive the respective lower edges of the said glass sheets thereon to support said sheets in said plane for movement in said machine adjacent the ends thereof, an endless tread having a forwardly facing flight parallel to said plane, an elongated integral way supporting said tread flight intermediate the ends thereof, one end of said tread flight overlapping a portion of said upper flight of said first conveyor and the other end of said tread flight overlapping a portion of the upper flight of said second conveyor, said tread flight spanning between and being spaced upwardly equidistant from said upper conveyor flights, and being positioned to engage the rearward face of each said glass sheet above the lower edge of said sheet with a section of glass sheet extending below said tread, roller means, means supporting said rollers opposite and parallel to said tread flight to engage the forward face of each said glass sheet and spaced from said tread flight for the entry of said glass therebetween, spring means urging said rollers toward said tread to hold said glass sheets against said tread for longitudinal movement of said glass by said tread, means for concurrently raising and lowering said conveyors to vary the said spacing of said tread edge therefrom and establish the length of the said lower glass sections for driving said conveyors and said tread in coordination; a plurality of grinders disposed below said tread angularly intersecting the plane of movement of said glass in the path of said lower sections and positioned beyond the end of said first conveyor flight to successively grindingly contact the said lower sections of said glass sheets moved by said tread adjacent the lower edge of said sections, each succeeding grinder being incrementally advanced forwardly of its predecessor whereby to remove successive layers of glass from said lower section and form a bevel thereon and means for rotating said grinders; a plurality of rotating polishers below said tread parallel to said grinders, positioned to polishingly contact the bevels formed by said grinders, means for rotating said polishers; and means for concurrently adjusting the angular position of said polishers and grinders relative to said plane of said glass.

3. A machine for processing glass sheets to form a bevel along one edge of said sheets, which includes means for supporting and longitudinally moving successive sheets of glass continuously through said machine in a fixed, substantially upright plane, said means including an endless conveyor at one end of said machine and a second endless conveyor at the opposite end thereof, each said conveyor extending longitudinally along a portion of said machine and having an upwardly facing upper flight disposed substantially at right angles to said plane, adapted to successively receive the respective lower edges of the said glass sheets thereon to support said sheets in said plane for movement in said machine adjacent the ends thereof, an endless tread having a forwardly facing flight parallel to said plane, one end of said tread flight overlapping a portion of said upper flight of said first conveyor and the other end of said tread flight overlapping a portion of the upper flight of said second conveyor, said tread flight spanning between and being spaced upwardly equidistant from said upper conveyor flights, and being positioned to engage the rearward face of each said glass sheet above the lower edge of said sheet with a section of glass sheet extending below said tread, roller means opposite said tread flight for engaging the forward face of each said glass sheet to hold said glass sheets against said tread for longitudinal movement of said glass by said tread, means for concurrently raising and lowering said conveyors to vary the said spacing of said tread edge therefrom and establish the length of the said lower glass sections and means for driving said conveyors and said tread in coordination; a plurality of grinders disposed below said tread angularly intersecting the plane of movement of said glass in the path of said lower sections and positioned beyond the end of said first conveyor flight to successively grindingly contact the said lower sections of said glass sheets moved by said tread adjacent the lower edge of said sections, each succeeding grinder being incrementally advanced forwardly of its predecessor whereby to remove successive layers of glass from said lower section and form a bevel thereon and means for rotating said grinders; a plurality of rotating polishers below said tread parallel to said grinders, positioned to polishingly contact the bevels formed by said grinders, means for rotating said polishers; and means for concurrently adjusting the angular position of said polishers and grinders relative to the said plane of said glass.

4. A machine for processing glass sheets to form a bevel along one edge of said sheets, which includes means for supporting and longitudinally moving successive sheets of glass continuously through said machine in a fixed plane, said means including an endless tread having a flight parallel to said plane, an elongated integral way supporting said tread flight intermediate the ends thereof, said tread flight being positioned to engage one face of each said glass sheet adjacent but spaced from one edge of said sheet with a section of said sheet extending beyond said tread, roller means, means supporting said rollers opposite and parallel to said tread flight to engage the opposite face of each said glass sheet and spaced from said tread flight for the entry of said glass therebetween, means for moving said supporting means toward and away from said tread to adjust said latter spacing to receive said glass sheets, spring means urging said rollers toward said tread to hold said glass sheets against said tread for longitudinal movement of said glass by said tread, stop means carried by said supporting means limiting spring urged movement of said rollers, means for driving said tread; a plurality of grinders disposed beyond said tread angularly intersecting the plane of movement of said glass to successively grindingly contact the said extending sections of said glass sheets moved by said tread adjacent said edge of said sections and remove successive layers of glass from each said section to form a bevel thereon, and means for rotating said grinders; a plurality of rotating polishers beyond said tread parallel to said grinders, positioned to polishingly contact the bevels formed by said grinders, means for rotating said polishers; and means for concurrently adjusting the angular position of said polishers and grinders relative to said plane.

5. A machine for processing glass sheets to form a bevel along one edge of said sheets, which includes means for supporting and longitudinally moving successive sheets of glass continuously through said machine in a fixed plane, said means including an endless tread having a flight parallel to said plane, an elongated integral way supporting said tread flight intermediate the ends thereof, said tread flight being positioned to engage one face of each said glass sheet adjacent but spaced from one edge of said sheet with a section of said sheet extending beyond said tread, roller means positioned opposite and parallel to said tread flight to engage the opposite face of each said glass sheet and spaced from said tread flight for the entry of a said glass therebetween, means for moving said roller means toward and away from said tread to adjust said latter spacing to receive and hold said glass sheets, and means for driving said tread; a plurality of grinders disposed beyond said tread angularly intersecting the plane of movement of said glass to successively grindingly contact the said extending sections of said glass sheets moved by said tread adjacent said edge of said sections to remove successive layers of glass from each said section and form a bevel thereon, and means for rotating said grinders; a plurality of rotating polishers beyond said tread parallel to said grinders, positioned to polishingly contact the bevels formed by said grinders, means for rotating said polishers; and means for concurrently adjusting the angular position of said polishers and grinders relative to said plane.

6. In a machine for processing glass sheets to form a bevel along one edge of said sheets, which includes means for supporting and longitudinally moving successive sheets of glass continuously through said machine in a fixed plane, said means including means positioned to engage the opposite faces of each said glass sheet to hold said glass sheets for longitudinal movement with a section of each said sheet extending beyond said engaging means; a plurality of polishers, means supporting said polishers beyond said engaging means with said polishers angularly intersecting said plane in the path of said extending sections to successively polishingly contact the said extending sections of said glass sheets moved by said glass supporting and moving means adjacent the said edge of said sections; said polisher supporting means including casing means, male crescent members carried by said casing means, female crescent members, means supporting said female members, said female members being slidably engaged by said male members to support said casing means for arcuate movement to vary said angular intersection, and means for effecting said arcuate movement, comprising internally threaded trunnion means pivotally secured to said casing means, screw means engaging said threaded trunnion means for relative advancement upon rotation of said screw means and retraction upon opposite rotation thereof, and means for effecting said rotations of said screw means; each said polisher including a hollow quill, a spindle slidably supported in said quill and projecting oppositely beyond the ends thereof, a rotatable polishing head mounted on one end of said spindle and disposed for said polishing contact, means for rotating said polishing heads, a compression spring interposed between said head and said quill, urging said spindle and said head to move into polishing contact with said glass sheets, a rack formed along one side of said quill, a pinion engaging said rack to advance said quill toward said head upon rotation of said pinion, a rotatable shaft carrying said pinion, motor means for driving said shaft to effect rotation of said pinion, and means for energizing said motor means comprising a switch disposed to abut the opposite end of one of said spindles, said abutment holding said switch open to interrupt energizing of said motor means, said abutment being interrupted by spring urged movement of said spindle to permit closing of said switch and energizing of said motor to effect quill-advancing rotation of said shaft and pinion, said quill advance recompressing said spring, and carriage means, supported by said quill, carrying said switch, advance of said quill effecting advance of said switch to reestablish switch abutment with said opposite spindle end.

7. In a machine for processing glass sheets to form a bevel along one edge of said sheets, which includes means for supporting and longitudinally moving successive sheets of glass continuously through said machine in a fixed plane, said means including means positioned to engage the opposite faces of each said glass sheet to hold said glass sheets for longitudinal movement; a plurality of polishers, means supporting said polishers beyond said engaging means to successively polishingly contact the said glass sheets moved by said glass supporting and moving means; each said polisher including a hollow quill, a spindle slidably supported in said quill and projecting oppositely beyond the ends thereof, a rotatable polishing head mounted on one end of said spindle and disposed for said polishing contact, means for rotating said polishing heads, a compression spring interposed between said head and said quill, urging said spindle and said head to move into polishing contact with said glass sheets, a rack formed along one side of said quill, a pinion engaging said rack to advance said quill toward said head upon rotation thereof, a rotatable shaft carrying said pinion, motor means for driving said shaft to effect rotation of said pinion, and means for energizing said motor means comprising a switch disposed to abut the opposite end of one of said spindles, said abutment holding said switch open to interrupt energizing of said motor means, said abutment being interrupted by spring urged movement of said spindle to permit closing of said switch and energizing of said motor to effect quill-advancing rotation of said shaft and pinion, said quill advance recompressing said spring, and carriage means, supported by said quill, carrying said switch, advance of said quill effecting advance of said switch to reestablish switch abutment with said opposite spindle end.

8. In a machine for processing glass sheets, which includes means for supporting and longitudinally moving successive sheets of glass continuously through said machine, a plurality of polishers, each including a polishing head, means supporting said polishers in position with said polishing heads successively polishingly contacting the said glass sheets moved by said glass supporting and moving means, and means for rotating said polishing heads; each said polisher including a hollow quill having a rack formed along one side thereof and a spindle supported in its said quill and projecting therebeyond, the said polishing head of each said polisher being mounted on the projecting end of its said spindle, a rotatable pinion carrying shaft, a pinion for each said polisher carried by said shaft, said pinions engaging said racks to retract said quills upon rotation of said shaft and pinions, means carried by said spindles engageable by said quills during retraction of said quills to effect retraction of said spindles and heads, motor means for driving said shaft to effect quill retracting rotation of said shaft and pinions, and means for energizing said motor means including a movable bumper positioned in advance of one of said heads beyond the polishing contact position thereof for abutment by said head upon advancement of said head beyond said polishing position, said abutment advancing said bumper, a switch for energizing said motor means for said retracting rotation, and means coupling said bumper and said switch to close said switch and effect said energizing upon bumper abutment and advancement by said head.

9. In a machine for processing glass sheets, which includes means for supporting and longitudinally moving successive sheets of glass continuously through said machine, a plurality of polishers, each including a polishing head, means supporting said polishers in position with said polishing heads successively polishingly contacting the said glass sheets moved by said glass supporting and moving means, and means for rotating said polishing heads, and means for advancing said polisher heads toward said polishing position; each said polisher includes a hollow quill having a rack formed along one side thereof, a spindle supported in its said quill and projecting therebeyond, the said polishing head of each said polisher being mounted on the projecting end of its said spindle, a rotatable pinion carrying shaft, a pinion for each said polisher carried by said shaft, said pinions engaging said racks to retract said quills upon rotation of said shaft and pinions, means carried by said spindles engageable by said quills during retraction of said quills to effect retraction of said spindles and heads, motor means for driving said shaft to effect quill retracting rotation of said shaft and pinions, means for energizing said motor means including a movable bumper positioned in advance of one of said heads beyond the polishing contact position thereof for abutment by said head upon advancement of said head beyond said polishing position, said abutment advancing said bumper, a switch for energizing said motor means for said retracting rotation, means coupling said bumper and said switch to close said switch and effect said energizing upon bumper abutment and advancement by said head, and spring means urging return of said bumper upon retraction of said head and relief of said abutment.

10. In a machine for processing glass sheets which includes means for supporting and longitudinally moving successive sheets of glass continuously through said machine, a plurality of polishers, each including a polishing head, a plurality of casings, each said casing supporting a polisher bank comprising a plurality of polishers positioned with said polishing heads successively polishingly contacting the said glass sheets moved by said glass supporting and moving means, and means for rotating said polishing heads and means for advancing said polisher heads toward said polishing position; each said polisher including a hollow quill having a rack formed along one side thereof, and a spindle supported in said quill and projecting therebeyond, the polishing head of each said polisher being mounted on the projecting end of its said spindle; each said bank including a rotatable pinion carrying shaft, a pinion for each said polisher carried by said shaft, said pinions engaging said racks and adapted upon rotation of said shaft to retract said quills, motor means for driving said shaft to effect quill retracting rotation by said shaft and pinions, and means for energizing the said motor means of said bank, including a movable bumper positioned in advance of one of said heads of said bank beyond the polishing contact position thereof for abutment by said head upon advancement of said head beyond said polishing position, said abutment advancing said bumper, a switch for energizing said motor means for said retracting rotation, and means coupling said bumper and said switch to close said switch and effect said energizing upon bumper abutment and advancement by said head.

11. In a machine for processing glass sheets which includes means for supporting and longitudinally moving successive sheets of glass continuously through said machine, a plurality of polishers, each including a polishing head, a plurality of casings, each said casing supporting a polisher bank comprising a plurality of polishers positioned with said polishing heads successively polishingly contacting the said glass sheets moved by said glass supporting and moving means, and means for rotating said polishing heads and means for advancing said polisher heads toward said polishing position; each said polisher including a hollow quill having a rack formed along one side thereof, and a spindle supported in said quill and projecting therebeyond, the polishing head of each said polisher being mounted on the projecting end of its said spindle; each said bank including a rotatable pinion carrying shaft, a pinion for each said polisher carried by said shaft, said pinions engaging said racks and adapted upon rotation of said shaft to retract said quills, motor means for driving said shaft to effect quill retracting rotation by said shaft and pinions, and means for energizing the said motor means of said bank, including a movable bumper positioned in advance of one of said heads of said bank beyond the polishing contact position thereof for abutment by said head upon advancement of said head beyond said polishing position, said abutment advancing said bumper, a switch for energizing said motor means for said retracting rotation, means coupling said bumper and said switch to close said switch and effect said energizing upon bumper abutment and advancement by said head, and spring means urging return of said bumper upon retraction of said head and relief of said abutment.

12. In a machine for processing glass sheets to form a bevel along one edge of said sheets, which includes means for supporting and longitudinally moving successive sheets of glass continuously through said machine in a fixed, substantially upright plane, said means including an endless tread having a flight parallel to said plane positioned to engage one face of each said glass sheet adjacent but spaced from one edge of said sheet with a section of said sheet extending beyond said tread, roller means positioned opposite to said tread flight to engage the opposite face of each glass sheet to hold said glass sheets against said tread for longitudinal movement of said glass by said tread; a conveyor for delivering said glass sheets to said tread and said roller means in substantially upright position, said conveyor having a flight disposed substantially at right angles to said tread flight, a portion of said conveyor flight underlying one end of said tread flight and being spaced therebelow, means adjustably supporting said conveyor to establish the spacing of said conveyor flight below said tread flight, comprising table means supporting said conveyor, internally threaded tubes attached to said table means, means slidably supporting said tubes for movement parallel to said plane, threaded shafts engaging said tubes, and means for rotating said shafts alternatively in opposite directions to effect said sliding movement of said tubes and adjustment of said spacing, said conveyor being adapted to receive said substantially upright glass sheets on said conveyor flight with the lower edges thereof seated on said conveyor flight, the said adjustment of said spacing establishing the length of said extending sections.

13. In a machine for processing sheets, which includes means for supporting and longitudinally moving successive said sheets continuously through said machine in a fixed plane, said means including an endless tread having a flight parallel to said plane positioned to engage one face of each said sheet adjacent but spaced from one edge of said sheet with a section of said sheet extending beyond said tread, means positioned opposite to said tread flight to engage the opposite face of each sheet to hold said sheets against said tread for longitudinal movement of said sheets by said tread; a conveyor for delivering said sheets to said tread and said opposite means in said plane, said conveyor having a flight disposed substantially at right angles to said tread flight, a portion of said conveyor flight lapping one end of said tread flight, and being spaced therefrom, means adjustably supporting said conveyor to establish the spacing of said conveyor flight from said tread flight, including internally threaded tubes attached to said supporting means, threaded shafts engaging said tubes, and means for rotating said shafts alternatively in opposite directions, to effect movement of said tubes and adjustment of said spacing, said conveyor being adapted to receive said sheets with edges thereof seated against said conveyor flight, the said adjustment of said spacing establishing the length of said extending sections.

14. In a machine for processing glass sheets to form a bevel along one edge of said sheets, which includes means for supporting and longitudinally moving successive sheets of glass continuously through said machine in a fixed, substantially upright plane, said means including an endless tread having a flight parallel to said plane positioned to engage one face of each said glass sheet adjacent but spaced from one edge of said sheet with a section of said sheet extending beyond said tread, roller means positioned opposite to said tread flight to engage the opposite face of each glass sheet to hold said glass sheets against said tread for longitudinal movement of said glass by said tread; a loading conveyor for delivering said glass sheets to said tread and said roller means in substantially upright position, an unloading conveyor for receiving said sheets in said position from said tread and roller means, said conveyors each having a flight disposed substantially at right angles to said tread flight, a portion of said loading conveyor flight underlying one end of said tread flight and a portion of said unloading conveyor flight underlying the opposite end of said tread flight, said conveyor flights being equally spaced below said tread flight, means adjustably supporting said conveyors to establish the spacing of said conveyor flights below said tread flight, comprising table means supporting said conveyors, internally threaded tubes attached to said table means, means slidably supporting said tubes for movement parallel to said plane, threaded shafts engaging said tubes, and means for rotating said shafts alternatively in opposite directions to effect said sliding movement of said tubes and adjustment of said spacing, each said conveyor being adapted to receive said substantially upright glass sheets on said conveyor flight with the lower edges thereof seated on said conveyor flights, the said adjustment of said spacing establishing the length of said extending sections.

15. In a machine for processing sheets, which includes means for supporting and longitudinally moving successive said sheets continuously through said machine in a fixed plane, said means including an endless tread having a flight parallel to said plane positioned to engage one face of each said sheet adjacent but spaced from one edge of said sheet with a section of said sheet extending beyond said tread, means positioned opposite to said tread flight to engage the opposite face of each sheet to hold said sheets against said tread for longitudinal movement of said sheets by said tread; a loading conveyor for delivering said sheets to said tread in said plane, an unloading conveyor for receiving said sheets in said plane from said tread, said conveyors each having a flight disposed substantially at right angles to said tread flight, a portion of said loading conveyor flight lapping one end of said tread flight, and a portion of said unloading conveyor flight lapping the opposite end of said tread flight, said conveyor flights being equally spaced from said tread flight, means adjustably supporting said conveyors to establish the spacing of said conveyor flights from said tread flight including, internally threaded tubes attached to said supporting means, threaded shafts engaging said tubes, and means for rotating said shafts alternatively in opposite directions, to effect movement of said tubes and adjustment of said spacing, each said conveyor being adapted to receive said sheets with edges thereof seated against said conveyor flights, the said adjustment of said spacing establishing the length of said extending section.

16. In a machine for processing sheet-like objects, a polisher which comprises a hollow quill having a rack formed along one side thereof, a spindle supported in said quill and projecting therebeyond, a polishing head mounted on the projecting end of said spindle and positioned to polishingly contact said objects, a rotatable shaft, a pinion carried by said shaft, said pinion engaging said rack to retract said quill away from said objects upon rotation of said shaft and pinion, motor means for driving said shaft to effect quill retracting rotation of said shaft and pinion, a movable bumper positioned in advance of said head beyond the polishing contact position thereof for abutment by said head upon advancement of said head beyond said polishing position, said abutment advancing said bumper, a switch for energizing said motor means for said retracting rotation, and means coupling said bumper and said switch to close said switch and effect said energizing upon bumper abutment and advancement by said head.

17. In a machine for processing sheet-like objects, a plurality of polishers, each polisher including a hollow quill having a rack formed along one side thereof, a spindle supported in said quill and projecting therebeyond, a polishing head mounted on the projecting end of said spindle and positioned to polishingly contact said objects, and means for rotating said heads; a rotatable pinion carrying shaft, a pinion for each said polisher carried by said shaft, said pinions engaging said racks to retract said quills away from said objects upon rotation of said shaft and pinions, motor means for driving said shaft to effect quill retracting rotation of said shaft and pinions, a movable bumper positioned in advance of one of said heads beyond the polishing contact position thereof for abutment by said head upon advancement of said head beyond said polishing position, said abutment advancing said bumper, a switch for energizing said motor means for said retracting rotation, and means coupling said bumper and said switch to close said switch and effect said energizing upon bumper abutment and advancement by said head.

18. A machine for processing glass sheets to form a bevel along one edge of said sheets, which includes means for supporting and longitudinally moving successive sheets of glass continuously through said machine in a fixed plane, said means including an endless tread having a flight parallel to said plane, an elongated integral way supporting said tread flight intermediate the ends thereof, said tread flight being positioned to engage one face of each of said glass sheet adjacent but spaced from one edge of said sheet with a section of said sheet extending beyond said tread, roller means positioned opposite and parallel to said tread flight to engage the opposite face of each said glass sheet and spaced from said tread flight for the entry of a said glass therebetween, means for moving said roller means toward and away from said tread to adjust said latter spacing to receive and hold said glass sheets, and means for driving said tread; a plurality of grinders disposed beyond said tread angularly intersecting the plane of movement of said glass to successively grindingly contact the said extending sections of said glass sheets moved by said tread adjacent said edge of said sections to remove successive layers of glass from each said section and form a bevel thereon, and means for rotating said grinders; and a plurality of rotating polishers beyond said tread parallel to said grinders, positioned to polishingly contact the bevels formed by said grinders, and means for rotating said polishers.

19. A machine for processing glass sheets to form a bevel along one edge of said sheets, which includes means for supporting and longitudinally moving successive sheets of glass continuously through said machine in a fixed plane, said means including an endless tread having a flight parallel to said plane, an elongated integral way supporting said tread flight intermediate the ends thereof, said tread flight being positioned to engage one face of each said glass sheet adjacent but spaced from one edge of said sheet with a section of said sheet extending beyond said tread, roller means positioned opposite and parallel to said tread flight to engage the opposite face of each said glass sheet and spaced from said tread flight for the entry of a said glass therebetween, means for moving said roller means toward and away from said tread to adjust said latter spacing to receive and hold said glass sheets, and means for driving said tread; and attrition means disposed beyond said tread and angularly intersecting the plane of movement of said glass to contact the said extending sections of said glass sheets moved by said machine.

20. A machine for processing sheet-like objects which includes means for supporting and longitudinally moving successive said objects continuously through said machine in a fixed substantially upright plane, said means including a plurality of plate-like members, the outer face of each member being provided with a flat, smooth, cushion-like facing, bracket-like means rigidly connected to the inner surface of said members and projecting inwardly from said inner surfaces substantially along the horizontal mid line of said inner surfaces, a roller chain pivotally connected to said bracket-like means to effect articulated connection between said plate-like members and form an articulated endless tread having a flight parallel to said plane in which said outer surfaces lie contiguous to said plane, elongated means rigidly supporting said tread flight against sagging intermediate the ends of said flight, said tread flight being positioned to engage one face of each said sheet-like object adjacent but spaced above one edge of said object with a section of said object extending below said tread, means positioned opposite and parallel to said tread flight to engage the opposite face of each said sheet-like object and spaced from said tread flight for the entry of a said object therebetween, means drivingly engaging said chain for driving said tread, and attrition means disposed below said tread and angularly intersecting said plane to contact the extending sections of each said sheet-like object moved by said machine.

21. A machine for processing sheet-like objects which includes means for supporting and longitudinally moving successive said objects continuously through said machine in a fixed substantially upright plane, said means including an endless tread having a flight parallel to said plane, an elongated way supporting said tread flight intermediate the ends thereof, said tread flight being positioned to engage one face of each said sheet-like object, means opposite to said tread flight positioned to engage the opposite face of each said sheet-like object, a belt-like conveyor positioned in advance of said tread flight having an upper flight substantially perpendicular to said plane to successively receive and support one edge of said sheet-like objects in upright position, said upper flight being spaced below the level of the lower edge of said tread flight and lapping and underlying one end of said tread flight, means for driving said conveyor and said tread, whereby to deliver successive edge-supported sheets to said tread flight with said edges spaced below said tread and to move delivered sheets through said machine with said edges projecting below said tread, and attrition means disposed to intersect said plane and contact the projecting edges of said sheet-like objects moved by said machine.

22. In a machine for processing sheets, which includes means for supporting and longitudinally moving successive said sheets continuously through said machine in a fixed plane, said means engaging the opposite faces of each sheet adjacent but spaced from one edge of said sheet with a section of said sheet extending beyond said means, a pair of conveyors for respectively delivering said sheets to and receiving said sheets from said sheet-engaging means in said plane, said conveyors being reciprocably adjustable relative to said means and parallel to said plane and each having a flight, said flights lying in a common plane disposed substantially at right angles to said sheet-engaging means, said flights respectively lapping the opposite ends of said sheet-engaging means and being spaced therefrom, and means for concurrently adjusting the position of said conveyors relative to said sheet-engaging means to establish the spacing of said conveyor flights from said sheet-engaging means, said conveyors being adapted to receive said sheets with edges thereof seated against said conveyor flights.

23. In a machine for processing sheets, which includes means for supporting and longitudinally moving successive said sheets continuously through said machine in a fixed plane, said means engaging the opposite faces of each sheet adjacent but spaced from one edge of said sheet with a section of said sheet extending beyond said means, a conveyor for delivering said sheets to said sheet-engaging means in said plane, said conveyor being reciprocably adjustable relative to said means and parallel to said plane and having a flight disposed substantially at right angles to said sheet-engaging means, a portion of said conveyor flight lapping one end of said sheet-engaging means and being spaced therefrom, and means for adjusting the position of said conveyor relative to said sheet-engaging means to establish the spacing of said conveyor flight from said sheet-engaging means, said conveyor being adapted to receive said sheets with edges thereof seated against said conveyor flight, the said adjustment of said spacing establishing the length of said extending sections.

24. In a machine for processing sheet-like objects, a plurality of polishers, each polisher including a spindle and a polishing head mounted on one end of said spindle and positioned to polishingly contact said objects, and means for rotating said heads; motor means, means drivingly coupling said motor means and said spindles for spindle retraction upon energizing of said motor means, a movable bumper positioned in advance of one of said heads beyond the polishing contact position thereof for abutment by said head upon advancement of said head beyond said polishing position, said abutment advancing said bumper, a switch for energizing said motor means, and means coupling said bumper and said switch to close said switch and effect said energizing upon bumper abutment and advancement by said head.

25. In a machine for processing sheet-like objects, polisher means including a spindle and a polishing head mounted on one end of said spindle and positioned to polishingly contact said objects, and means for rotating said head; motor means, means drivingly coupling said motor means and said spindle for spindle retraction upon energizing of said motor means, a movable bumper positioned in advance of said head beyond the polishing contact position thereof for abutment by said head upon advancement of said head beyond said polishing position, said abutment advancing said bumper, a switch for energizing said motor means, and means coupling said bumper and said switch to close said switch and effect said energizing upon bumper abutment and advancement by said head.

26. In a machine for polishing sheet-like objects, a polisher which includes a spindle, means supporting said spindle, a rotatable polishing head mounted on one end of said spindle and disposed for polishing contact with said sheet-like objects, a compression spring interposed between said head and said supporting means, urging said spindle and said head to move into polishing contact with said glass sheets, motor means, means drivingly coupling said motor means to said supporting means for advance of said supporting means responsive to motor energization, and means for energizing said motor means comprising a switch disposed to abut the opposite end of said spindle, said abutment holding said switch open to interrupt energizing of said motor means, said abutment being interrupted by spring urged movement of said spindle to permit closing of said switch and energizing of said motor to effect advance of said supporting means, said advance recompressing said spring.

27. In a machine for polishing sheet-like objects, a polisher which includes a spindle, means supporting said spindle, a rotatable polishing head mounted on one end of said spindle and disposed for polishing contact with said sheet-like objects, a compression spring interposed between said head and said supporting means, urging said spindle and said head to move into polishing contact with said glass sheets, motor means, means drivingly coupling said motor means to said supporting means for advance of said supporting means responsive to motor energization, means for energizing said motor means comprising a switch disposed to abut the opposite end of said spindle, said abutment holding said switch open to interrupt energizing of said motor means, said abutment being interrupted by spring urged movement of said spindle to permit closing of said switch and energizing of said motor to effect advance of said supporting means, said advance recompressing said spring, and carriage means, supported by said supporting means, carrying said switch, said advance effecting advance of said switch to reestablish switch abutment with said opposite spindle end.

28. In a machine for polishing sheet-like objects, polisher means which include a spindle, means supporting said spindle, a polishing head mounted on one end of said spindle and disposed for polishing contact with said sheet-like objects, a compression spring interposed between said head and said supporting means, urging said spindle and said head to move into polishing contact with said glass sheets, reversible motor means, means drivingly coupling said motor means to said supporting means for advance of said supporting means responsive to motor energization and for retraction of said supporting means responsive to reverse motor energization, means for energizing said motor means comprising a switch disposed to abut the opposite end of said spindle, said abutment holding said switch open to interrupt energizing of said motor means, said abutment being interrupted by spring urged movement of said spindle to permit closing of said switch and energizing of said motor to effect advance of said supporting means, said advance recompressing said spring, a movable bumper positioned in advance of said head beyond the polishing contact position thereof for abutment by said head upon advancement of said head beyond said polishing position, said abutment advancing said bumper, a second switch for reversely energizing said motor means, and means coupling said bumper and said second switch to close said second switch and effect said reverse energizing upon bumper abutment and advancement by said head.

29. In a machine for polishing sheet-like objects, a plurality of polishers, each polisher including a spindle, means supporting said spindle, a rotatable polishing head mounted on one end of said spindle and disposed for polishing contact with said sheet-like objects, and a compression spring interposed between said head and said supporting means, urging said spindle and said head to move into polishing contact with said glass sheets; reversible motor means, means drivingly coupling said motor means to said supporting means for advance of said supporting means responsive to motor energization and for retraction of said supporting means responsive to reverse motor energization, means for energizing said motor means comprising a switch disposed to abut the opposite end of one of said spindles, said abutment holding said switch open to interrupt energizing of said motor means, said abutment being interrupted by spring urged movement of said spindle to permit closing of said switch and energizing of said motor to effect advance of said supporting means, said advance recompressing said spring, a movable bumper positioned in advance of one of said heads beyond the polishing contact position thereof for abutment by said head upon advancement of said head beyond said polishing position, said abutment advancing said bumper, a second switch for reversely energizing said motor means, and means coupling said bumper and said second switch to close said second switch and effect said reverse energizing upon bumper abutment and advancement by said head.

ROBERT L. MOORE.
MAURICE HENKIN.

REFERENCES CITED

The following references are of record in the file of this patent:

UNITED STATES PATENTS

| Number | Name | Date |
|---|---|---|
| 1,550,102 | Schlueter | Aug. 18, 1925 |
| 1,660,350 | Owen | Feb. 28, 1928 |
| 1,673,910 | Gipe | June 19, 1928 |
| 1,680,044 | Hitchcock | Aug. 7, 1928 |
| 1,680,920 | Weber | Aug. 14, 1928 |
| 1,724,677 | Owen | Aug. 13, 1929 |
| 1,728,647 | Weber | Sept. 17, 1929 |
| 1,785,737 | Jones | Dec. 23, 1930 |
| 1,797,342 | Hitchcock | Mar. 24, 1931 |
| 1,850,432 | Weber | Mar. 22, 1932 |
| 1,958,525 | Weber | May 15, 1934 |
| 1,958,526 | Weber | May 15, 1934 |
| 2,102,374 | Moore | Dec. 14, 1937 |
| 2,124,705 | Locklin | July 26, 1938 |
| 2,244,813 | Tommerup | June 10, 1941 |
| 2,373,149 | Stricken | Apr. 10, 1945 |

FOREIGN PATENTS

| Number | Country | Date |
|---|---|---|
| 1,685 | Great Britain | Jan. 24, 1895 |